US010732813B2

(12) United States Patent
Boshoff et al.

(10) Patent No.: US 10,732,813 B2
(45) Date of Patent: Aug. 4, 2020

(54) USER CONTROL OF THE TRADE-OFF BETWEEN RATE OF NAVIGATION AND EASE OF ACQUISITION IN A GRAPHICAL USER INTERFACE

(71) Applicant: Flow Labs, Inc., Menlo Park, CA (US)

(72) Inventors: Hendrik Frans Verwoerd Boshoff, Stellenbosch (ZA); Filippus Lourens Andries Du Plessis, Stellenbosch (ZA); Willem Morkel Van Der Westhuizen, Stellenbosch (ZA); Jan Pool, Stellenbosch (ZA); Johannes Petrus Van Zyl, Stellenbosch (ZA); Adri Van Der Merwe, Durbanville (ZA)

(73) Assignee: Flow Labs, Inc., Menlo Park, CA (US)

( * ) Notice: Subject to any disclaimer, the term of this patent is extended or adjusted under 35 U.S.C. 154(b) by 0 days.

(21) Appl. No.: 16/420,658

(22) Filed: May 23, 2019

(65) Prior Publication Data
US 2019/0302994 A1 Oct. 3, 2019

Related U.S. Application Data

(62) Division of application No. 14/653,708, filed as application No. PCT/ZA2013/000094 on Dec. 13, 2013, now abandoned.

(51) Int. Cl.
*G06F 3/0484* (2013.01)
*G06F 3/0482* (2013.01)
*G06F 3/0488* (2013.01)

(52) U.S. Cl.
CPC ........ *G06F 3/04847* (2013.01); *G06F 3/0482* (2013.01); *G06F 3/04842* (2013.01); *G06F 3/04845* (2013.01); *G06F 3/04886* (2013.01)

(58) Field of Classification Search
CPC .............. G06F 3/0236; G06F 3/04842; G06F 3/04812; G06F 3/04817; G06F 3/167; G06F 3/04886
See application file for complete search history.

(56) References Cited

U.S. PATENT DOCUMENTS

| 8,046,705 B2 | 3/2011 | Hunleth et al. |
| 2008/0126998 A1* | 5/2008 | Kojo ..................... G06F 3/0482 715/857 |

(Continued)

FOREIGN PATENT DOCUMENTS

| WO | WO 2006/082285 A1 | 8/2006 |
| WO | WO 2009/042926 A1 | 4/2009 |

(Continued)

OTHER PUBLICATIONS

Kajastila, R. et al., "Funkypod: Integrating Auditory and Visual Menus," International Workshop on the Principles and Applications of Spatial Hearing, Nov. 11-13, 2009, pp. 1-4.

(Continued)

*Primary Examiner* — Seth A Silverman
(74) *Attorney, Agent, or Firm* — Fenwick & West LLP

(57) ABSTRACT

The invention provides a method for dynamic user control over the layout of a graphical user interface. The method includes the steps of receiving a description of the way in which a control region in the interface is allocated to a plurality of virtual objects, without object overlap, receiving the position of a user point, reallocating a fraction of the control region from at least one object to a different object, based on the user point position, allocating a part of a display region in the interface to at least one of the objects, based on the current allocation of the control region to said object, but with control-display decoupling, and repeating the previous (Continued)

three steps fast enough that the user will perceive the changes as substantially continuous.

21 Claims, 27 Drawing Sheets

(56) References Cited

U.S. PATENT DOCUMENTS

| | | | |
|---|---|---|---|
| 2009/0183100 A1 | 7/2009 | Eom et al. | |
| 2010/0100849 A1* | 4/2010 | Fram | G06F 3/0236 715/835 |
| 2010/0299637 A1 | 11/2010 | Chmielewski et al. | |
| 2010/0306702 A1* | 12/2010 | Warner | G06F 3/0482 715/811 |
| 2011/0138324 A1 | 6/2011 | Seeney et al. | |
| 2012/0240059 A1 | 9/2012 | Kim | |

FOREIGN PATENT DOCUMENTS

| | | |
|---|---|---|
| WO | WO 2010/116028 A2 | 10/2010 |
| WO | WO 2013/049864 A1 | 4/2013 |

OTHER PUBLICATIONS

PCT International Search Report, PCT Application No. PCT/ZA2013/000094, May 2, 2014, 6 pages.
PCT Written Opinion, PCT Application No. PCT/ZA2013/000094, May 2, 2014, 9 pages.
PCT International Preliminary Report on Patentability, PCT Application No. PCT/ZA2013/000094, Mar. 25, 2015, 24 pages.
United States Office Action, U.S. Appl. No. 14/653,708, dated Aug. 28, 2018, 27 pages.
United States Office Action, U.S. Appl. No. 14/653,708, dated Dec. 13, 2017, 25 pages.
United States Office Action, U.S. Appl. No. 14/653,708, dated May 2, 2017, 25 pages. pages.

* cited by examiner

Figure 18. Schematic division of display space during receding horizons recursion

USER CONTROL OF THE TRADE-OFF BETWEEN RATE OF NAVIGATION AND EASE OF ACQUISITION IN A GRAPHICAL USER INTERFACE

CROSS-REFERENCE TO RELATED APPLICATIONS

This application is a divisional of co-pending U.S. application Ser. No. 14/653,708, filed Jun. 18, 2015, which is a national phase application under 35 U.S.C. § 371 of PCT/ZA2013/000094, filed on Dec. 13, 2013, each of which are incorporated by reference in their entirety.

TECHNICAL FIELD OF THE INVENTION

This invention relates to a method for human-computer interaction (HCI) on a graphical user interface (GUI).

BACKGROUND TO THE INVENTION

The inventors are aware that the graphical user interface (GUI) as a paradigm for human interaction with computers and other devices is well established. It requires visually communicating a selected part of the computer's changing state to the human user, while tracking certain aspects of the human bodily motion and interpreting them as controls to the computer.

The limitations on the speed, accuracy and amplitude of human movement have been widely studied using a constraint called Fitts' Law. In the field of HCI it puts a lower limit on the time required by a human to complete a movement over a known distance A to a target of known size W. The central claim of Fitts' Law is that the ratio A/W is the sole determinant of an index of difficulty, which in turn predicts the minimum movement time.

Even in the simple tasks considered by Fitts (reciprocal tapping, disc transfer and pin transfer), an additional geometrical constraint has to be assumed for the tasks to even make sense: W has to be smaller than A/2, otherwise no movement is necessary, since the target has already been reached.

Human capacity is thus not the only constraint on this type of problem, especially when a large number of targets are presented for user selection, as is done in the typical GUI. With many objects of interest competing to be selected, the geometrical constraints proliferate and grow in importance. They stem from the desire to avoid ambiguity, and therefore to disallow the overlap of objects. In the simple case of equally sized objects, the common size W has to be smaller than half the distance between the pair of nearest neighbours in the space, echoing Fitts' geometrical constraint.

The pointing advantage of any object may be increased by either increasing its size, or bringing it closer to the current position of the user's pointer. However, these two strategies clash when the pointing advantage of many objects have to be increased, due to the above-mentioned geometrical constraints. If the objects are tiled in space without overlap, any increase in size has to be compensated for by moving the objects further apart.

This inverse relationship between object sizes and inter-object distances is quite general, and a trade-off needs to be made between rate of navigation and ease of acquisition. The space available to accommodate GUI objects is always limited, either by the hardware used or by the maximum extent of human vision and movement.

The Functional Physical Subspaces of Human-Computer Interaction (HCI)

The visual communication during HCI takes place via an optical projection from a display space, functionally created by the computer display device's ability to generate light, into a visual space, functionally created by the ability of the user's eye to see. The light-sensitive retina is a surface, and the projected image of the visual space on it is two-dimensional. The two spatial coordinates of a point in visual space thus detectable by one eye may be interpreted as angles of incidence, leaving distance to be determined by other means. Each eye has its own visual space, although the visual spaces of one person's two eyes usually overlap substantially.

Sports arenas, shop windows and theatrical stages are inherently three-dimensional display spaces, but like the retina, computer display devices are based on surfaces. Computer synthesis of a three-dimensional display space may be achieved by using two different but coordinated display surfaces, one aimed at each of the two eyes. The mental synthesis of a three-dimensional cognitive visual space is somehow accomplished by the human brain. Visual objects are mostly perceived to be "out there" in visual space and not connected to the eye.

The tracking of human movement during HCI takes place in the intersection between a motor space, functionally created by the user's ability to move physical things, and a control space, functionally created by the computer input device's tracking range or freedom to be moved. These two spaces are primarily three-dimensional, although the action is usually transferred across a curved contact or control surface bounding the input device. Also, the device is often purposely constrained in such a way that the control space is reduced to a limited extent in one or two dimensions only. Action is mostly perceived to take place "right here" in motor space.

Each of the four private spaces mentioned above is a bounded and changing subspace of the same public physical space shared by the user, the computer, and things in their environment. The private spaces may overlap to varying degrees at different times. Two spatial intersections strictly needed for HCI have already been alluded to above, but others are optional. For example on the human side, we may see what is out of reach or move what is not visible. On the computer side, the display and control spaces may be disjunct (e.g. screen and mouse), they may overlap partially (e.g. split screen) or they may overlap completely (e.g. touch screen).

Motor and Visual Advantages

The healthy human body has very specific and limited motor abilities, of interest to the student of physical ergonomics. These limitations affect the possible speed and extent of movement, the amount of force that can be exerted, the number of repetitions that can be performed, the precision of control, etc. The designer of a tool must adapt its control surfaces and methods to human abilities, not only to enable effective and intuitive use, but also to lower the risk of error and to counter fatigue.

A tool may provide its user with a motor advantage for a certain task, by changing some aspect of the movement required or the properties of a control surface. Levers are widely used in cutting tools for example, to provide the mechanical motor advantage of lowering the required force. Any such advantage comes at a cost, in this case of having to enlarge the extent of movement proportional to the amount of leverage provided. In addition, what counts as a motor advantage depends on the user and the details of the task. In eye surgery, the enlarged extent of movement required by a lever may be exactly what is desired for more precision in performance, and precision is more problematic in this case than force. Motor advantage may be fixed (e.g. scissors), adjustable (e.g. bicycle gears) or variable (e.g. continuously variable transmission).

Human perceptual limitations are also important for the design and use of tools. A visual advantage may be provided for a certain task, by changing what is visible about the tool and its use. Optical lenses are employed in many tasks to provide the visual advantage of magnification or better focus. Again the advantage has a cost, in the case of magnification, the diminished field of view. In addition, a tool may provide the visual advantage of making its affordances visible.

Motor and visual advantages are often closely associated and they may affect each other via feedback. But they are not the same and they should be considered independently. A watchmaker using a magnifying glass for enlargement does not gain a direct motor advantage from it, because it stretches the display space but not the control space. Indirectly of course, better visual feedback may improve performance, but only to the extent that closing the control loop enables more accurate movement already within the motor ability of the watchmaker.

Dynamic Allocation of the Available Functional Space

We assume that the computer has no direct control over the private human motor and visual spaces, which may be shifted and directed (if not extended) at will by their owner. The private computer control and display spaces are therefore the only functional spaces whose use may be optimized for interaction by the system architect, by creating motor and visual advantages.

The allocation of portions of the available display space to computer display elements (conferring visual advantage), and of portions of the available control space to computer control functions (conferring motor advantage) is an important and recurring problem of HCI design. The usable extent of both spaces is limited, while the amount of content accessible or creatable on many devices is so large as to be practically infinite. Thus, no exhaustive, fixed allocation of space is possible—the allocation has to be dynamic: either discretely adjustable or continuously variable.

Many discrete and continuous ways have been invented to perform linear dynamic computer space allocation in two dimensions, including virtual paging, scrolling, zooming, panning, and rotation. Non-linear space allocation like distortion has also been used. Navigation of a virtual three-dimensional space amounts to a linear method as well, and non-linear allocation is possible in three dimensions too.

A different approach to solving the dynamic space allocation problem is based on hierarchical methods. In two dimensions this includes the use of potentially overlapping windows that may be displayed and navigated recursively. Other traversal methods for large hierarchical data sets include ring trees, cone trees, beam trees, botanical trees and hyperbolic browsing.

The C-D Function

The dynamic space allocation methods are ordinarily designed to change the interactive use of display space and control space in exactly the same way, modifying their allocation in tandem over time. The tight coordination between the spaces is generally sufficient for the user to maintain a coherent mental picture and grasp of the interaction that is in progress. This human-experienced connection between computer control and display is the result of potentially very complex processing by the computer in converting input to output. Interactive aspects of the input/output relation are commonly measured by the control-display or C-D function. It is similar to mechanical leverage and is useful in the description of as simple a device as an oscilloscope, where the C-D gain or ratio is a discretely adjustable amplification factor.

It is not known exactly what constitutes a good or optimal C-D function. It clearly depends on the user, and probably on the task as well. Proportionality is sufficient in many cases, but is it necessary? Should the function be constrained to be an isomorphism between control space and display space? How much delay can the user tolerate (>50 ms)? Can the C-D function change with time? Are discontinuities always jarring? Early views were that the C-D function had to be simple in order not to confuse the user, but it turns out that users may tolerate and benefit from a substantial amount of non-linearity and hysteresis.

Dynamic space allocation and designing a good C-D function are related, and they may simply be two perspectives on the same problem.

Linking and Separation of Control and Display

The pointer and icons of the GUI are all objects in the computer's two-dimensional display space. The pointer object is a visual aid for the user to identify a single point in display space, namely the pointer position or user point. It is meant to be the visual focal point of the user, but it also represents the motor locus of action in the simplified world of the GUI, where action is controlled by a single point. The GUI act of icon selection for example, is made dependent on a relation which is made apparent in display space, namely, which icon's area contains the pointer position at the time of a click. Both the making dependent and the making apparent are achieved by computer processing, and they may be regarded as different aspects of one complex C-D function.

The pointer position is the point in display space where the GUI's control and display operations are most tightly coupled. By changing the C-D function, this coupling may be relaxed at other points, preferably without incurring a disastrous disconnect between the user and the computer. We therefore consider the possibilities of the separation of computer control and display spaces, parallel to the separation of user motor and visual advantages. The former separation will be referred to as control-display decoupling.

Dynamic control-display decoupling may be achieved e.g. by applying a distortion to the display, and making the distortion move with the user point. From the user's point of view, dynamic control-display decoupling may be detected in the following way. Even though an object on the display can be seen to include some particular point at one time, if the user point is moved to that point (without any clicking or dragging), the object no longer contains the point in question at the time the user point reaches it. An example of the application of dynamic control-display decoupling may be found in the Mac OS Dock in its animated version.

Intuitive thinking about objects in display space can be misleading about interaction. When the size of an object increases in display space, it is easy to assume that there is more control space available to manipulate it as well. We saw that this is not even true when looking at real objects through a magnifying glass. The relevant human movement takes place in the unchanged control space, not in the enlarged display space. But in the case of HCI it may be worse, because the C-D function can take almost any causal form. The two spaces are connected only by the relative physical arrangement of the input and output devices, and some computer processing. Coordination in allocation of the spaces is synthetic in the virtual world, not automatic as it would be in the (undistorted) real world.

The potentially puzzling failure of the Mac OS animated dock to derive motor advantage from non-linear distortion may be understood in these terms. The task is selection of one among many icons on a bar of fixed length and the method includes enlarging the display size of the icons closest to the pointer, while decreasing the size of those further away to make room. It is an application of a one-dimensional fish-eye distortion to display space, where the distortion function is centred on the pointer position and is moved around with the pointer. This creates a continuously variable visual advantage for the user, but no direct motor advantage. The method is comparable to using a magnifying glass on display space while the action proceeds in the unchanged control space.

The pointer position itself is not affected by the distortion, because the pointer position is always made the fixed point of the distortion function, even as it moves. The display space thus remains undistorted at the focal point, and consequently the icon overlapping the pointer position is also undistorted at that point. The distortion therefore never changes the decisive spatial relation between pointer and icons at the locus of action, which is the only point that matters for motor advantage. It is thus possible to have dynamic control-display decoupling without any motor advantage.

This remains true even though icon areas and pointer position may all continually change due to changing user input, whether in response to visual feedback or not. The changes in locus of action and distortion are correlated, because both are determined by the same pointer position, but that does not imply causation either way.

It would be easy to define a distortion function that displaced the pointer. However, positive feedback and instability would result if the pointer were displaced while the link between focal point and locus of action were kept intact. User sense of control may be lost, and it is not clear whether any motor advantage can be achieved in this way. On the other hand, the mentioned link seems essential for maintaining coherent interaction, at least in the GUI style.

Prior Art in Creating HCI Motor Advantage

Allocation of more control space to a computer control function gives the user a certain motor advantage in using that function. For example, making a button larger in control space can make its selection quicker and easier. The added space would normally need to be contiguous with the function's current control space to make sense. With a finite control space, the added space has to be either previously unallocated or taken away from another function. Linear methods like zooming and panning of the coupled control and display spaces may be the simplest and most intuitive way to gain an increase in control space for the items remaining or newly appearing on the display. However, treating the control and display spaces as separate or separable, opens up new ways of gaining motor advantage via control-display decoupling.

Dealing with the decoupling of display and control may be difficult at first, but it offers the opportunity of doing things that would otherwise be impossible. We will survey the state of the art in creating motor advantage, and then propose new improved methods.

Various types of motor advantage have been obtained where the control and display spaces are decoupled, and they all seem to involve memory or hysteresis of some kind. The current state of the art appears limited to the following types:
(i) Time-dependent non-linear C-D functions, such as pointer acceleration based on speed, on distance traveled in control space or on time elapsed since the movement started. (ii) Semantic Pointing, which consists of adapting the C-D function in a discrete way, based on computer-internal feedback from the display space, indicating every time that the pointer has crossed a boundary between two regions whose meanings are distinct in some way. (iii) Object Pointing, which treats regions of display space not allocated to any object as something to be skipped by the pointer, without the need for a corresponding control movement. (iv) An improvement on the Mac OS dock, where the direction of motion of the cursor on entry into the bar is used to determine the focus point of the regular fish-eye distortion, which distortion is then held fixed for a second or so, after which the motor advantage lapses again.

Many methods have been developed to make the size—distance trade-off that redirects the motor advantage, or to use time to have the same space serve different objects. The most straight-forward of these are variations on scrolling, where the size remains fixed, and objects lost on one side are replaced by other gained on the opposite side. Paging may be viewed as a discrete way of scrolling. During zooming a single magnification factor is applied around a focus point as anchor, to change the size, but to lose objects on the periphery as they move away. These are the linear options.

Non-linear strategies are known as distortion or fisheye views, where variable magnification (and compression) is used to make the trade-off. Simply providing visual magnification does not equate to greater ease of selection however, as can be seen in the Apple Dock. Navigation through a distorted view is called focus targeting, and it presents the difficulty that apparent movement of objects due to moving the focus reaches a maximum at the focus point, where the magnification is the largest. This is another guise in which the size—distance trade-off appears.

Recently, methods have been developed to interactively control the trade-off, as in the technique called orthozoom scrolling and in speed-dependent auto-zoom (SDAZ). These methods improve the speed and ease of interaction.

We thus find in the art the following approaches to the size—distance trade-off:

Distortion methods that implement control-display decoupling, but provide no pointing or motor advantage, because only the display is distorted (Mac OS Dock, animated)

Methods based on the linear transformations of translation and scaling using various types of control, which provide the shifting of the pointing advantage (scrolling, paging, zooming, space traversal, such as dasher) and a variable amount of pointing advantage (Ortho-Zoom Scroller, Zoomslider) These methods do not include control-display decoupling.

Distortion methods that are speed-controlled (speed-dependent auto-zoom) or time-controlled (thweel).

But there appears to be no method that provides all of the following:

Position dependent control

A variable pointing advantage under direct user control

The context of a distortion based GUI with control-display decoupling.

The potential advantages of such methods include increased interaction speed and efficiency, interaction with a large number of objects at the same time, and improved user satisfaction.

So there remains a need in the art for a method of position dependent control of the trade-off between rate of navigation and ease of acquisition in a distortion based graphical user interface. The current invention addresses that need to give the user dynamic control over the layout of the GUI.

GENERAL DESCRIPTION OF THE INVENTION

According to the invention there is provided a method for dynamic user control over the layout of a graphical user interface, which includes the steps of:
receiving a description of the way in which a control region in the interface is allocated to a plurality of virtual objects, without object overlap;
receiving the position of a user point;
reallocating a fraction of the control region from at least one object to a different object, based on the user point position;
allocating a part of a display region in the interface to at least one of the objects, based on the current allocation of the control region to said object, but with control-display decoupling;
and repeating the previous three steps fast enough that the user will perceive the changes as substantially continuous.

The virtual objects may be understood to represent one or more control functions.

It will be appreciated that while the incremental reallocation of the control region during each of the method's repetitions may be linear, the effect of repetition can still have a non-linear result. Where the reallocation results in larger areas for objects close to the pointing object, it leads to greater ease of selection of those objects, but it also necessarily implies a larger distance and therefore a lowered rate of navigation to distant objects. This illustrates that the motor advantage for ease of selection is inversely related to the motor advantage for rate of navigation.

The method thus offers the user dynamic position control of the trade-off between ease of selection and rate of navigation, in a setting where the display space, but also and independently the control space, may be distorted. The degree of decoupling between control and display distortions is limited by the user's ability to make sense of the interaction process and to remain in control.

The method, in the step of reallocating a fraction of the control region, may include using a control algorithm and/or heuristic to effect the reallocation and pointing or navigation between objects in the control region.

The method, in the step of allocating a part of the display region, may make use of a display algorithm and/or heuristic, which may include drawing a graphical representation of the object on the display.

While any dynamic control-display decoupling for at least one of the objects is sufficient for the method, a strong decoupling is preferred, especially for those objects whose control region allocations are far from the user point.

It will be appreciated that repeating the three steps as specified in the method, leads to the creation of an interaction loop that the user can control in a substantially continuous way. For the changes to be perceived as substantially continuous, the repetition rate must be about times per second or preferably faster.

If the method includes using a control algorithm and/or heuristic to effect the reallocation and pointing or navigation between objects in the control region, the control algorithm and/or heuristic may be set up in such a way that:
the reallocation of the fraction of the control region is controlled directly or indirectly by one position coordinate for the user point;
the pointing or navigation is controlled directly or indirectly by another, preferably orthogonal, position coordinate of the user point;
some form of memory is employed to enable the control algorithm and/or heuristic to depend directly or indirectly on past values of the position coordinates of the user point;
the reallocation of the control region may be characterized by a distortion function of position and/or of time.

In this case, the method uses coordinates that are preferably orthogonal to each other. This has the advantage that the two effects of navigation in and reallocation of the control region may be independently controlled. The control algorithm may preferably use polar coordinates, i.e. use the radial position coordinate of the pointing object to control the reallocation of the control region and the transversal (angular) coordinate to control the navigation in control space. These two coordinates are indeed orthogonal.

In some embodiments of the invention, the reallocation of the control region is viewed as changes in the position coordinates of the objects in control space. The next position of any particular object may then be calculated as a function of the pointer position, the anchor point or line, the previous positions of the objects, and additionally, for two different embodiments,
the previous position of the user point; or
a control weight may be assigned to each object, with current values of the control weight, which in turn depend on past control weight values and the current position of the user point.

The method may then include using a control weight algorithm and/or heuristic to determine a new control weight for each object according to the radial distance of the pointer object position relative to the reference point and/or relative to each object control position;
using a control space sector algorithm and/or heuristic to determine a new unique control space sector for each object according to the control weight of each object;
using a control position algorithm and/or heuristic to determine a new object control position for each object according to:
the pointer object position angle with respect to the reference line or
the current object control position of the nearest object to the pointer object, and/or
the control weight of each object; and
mapping the new object control positions to new object display space positions and updating the display of the object representations.

It will be appreciated that when previous values are used in calculations, this use constitutes a memory or hysteresis effect.

It will be appreciated that when the user controls the trade-off between rate of navigation and ease of selection, that such control actually constitutes meta-control, in the sense that the user thereby controls the layout of the GUI and thus determines how sensitive the system will be to control in future.

It will be appreciated that some embodiments of the invention may respond in ways that the user may not expect. It is important to provide virtually continuous feedback to the user in order to support the illusion of direct manipulation and control that supports the functioning of the interaction.

It will be appreciated that the invention provides many pathways for feedback that may lead to instability in the system if positive feedback can result from user input. The designer of embodiments of the invention is responsible to choose parameters that will minimise the risk of instability.

It will be understood that the algorithm and/or heuristic to determine a new control weight and the algorithm and/or heuristic to determine a new object control position and a unique control space sector for each object may be one algorithm and the steps may be combined into one step. In addition, it will be appreciated that some values to be used in an algorithm or heuristic can be directly or indirectly determined or calculated.

It will further be understood that the algorithm and/or heuristic to determine a new object control position can use the current pointer object position angle with respect to the reference line instead of the current radial distance of the pointer object position in which case the algorithm and/or heuristic to determine a new object control position and a unique control space sector will use the current radial distance of the pointer object position instead of the angle.

It will further be understood that, by implication, radial distances to each object will differ once the pointer object moves the reference point and that the control weight and therefore the size of each corresponding control space sector for each object will differ in the same relation. It will be appreciated that this feature further distinguishes the invention from zoom and pan type applications.

Each object may be respectively positioned, in the control space, on the border of a convex space to provide a unique position and a unique segment of the control space for each object relating to the computer input device.

The border of the convex space may be finite such as a straight line or a segment of a circle.

The method, if it includes using an algorithm and/or heuristic to determine the new control position and unique control space sector for each object, may use the current object position angle as a fixed line to anchor the change in the object control position and sectors.

Alternatively, the method, if it includes using an algorithm and/or heuristic to determine the new control position and unique control space sector for each object, may use the current object control position of the nearest object to the pointer object position as a fixed line to anchor the change in the object control position and sectors.

It will be appreciated, and it forms part of the invention, that the radial distance of the object position and the pointer object position angle with respect to the reference line are radial and transverse coordinates and can be transformed to other coordinates such as rectangular coordinates.

The algorithm and/or heuristics for determining the new control weight may preferably be based on a nonlinear function and/or heuristics, which may preferably be exponential.

The refresh rate of the algorithms and/or heuristics may be selected to display the changes in object positions to appear continuous to the user.

The algorithm to determine the new control weight may preferably be based on an absolute pointer position where needed to avoid positive feedback.

The method may include a step of setting a maximum control weight for an object above which no control space sector is allocated in the control space for the object. It will be appreciated that, advantageously, more control space can then be allocated to the remaining objects with higher control weight.

The step of allocating a control weight to an object and/or the step of determining a new control weight for an object may include:

allocating and updating respective weights to objects independently;

allocating and updating respective weights to objects based on a function of the objects' structure in memory; and allocating and updating values to objects based on some property of control space itself.

The method may include a step of using an action algorithm and/or heuristic to determine an action to be performed, if any.

If an action to be performed has been determined by the action algorithm and/or heuristic, the method may include a step of performing the action.

When mapping the object control positions to display positions in display space and displaying a representation of the objects in relation to their display positions, one or more objects may be displayed at positions removed from their display space positions and therefore removed from their control space positions.

The method may include a step of selecting an object or allowing an object to be selected, to provide a result similar to selection in terms of the known GUI selection practices. The method then may include the step of establishing a threshold in the control space. When a threshold is crossed, a corresponding object is selected.

The method may be combined with known methods for navigation and/or selection of objects. Such known methods may preferably be methods that reallocate display space in response to changes in cursor movement.

The method as described herein wherein the control space may be a three-dimensional space.

The method may include the step of tracking a pointer object back to the pointer reference point in the control space to reverse input action by a user.

The method may include sensing the pointer object at or near to the pointer reference point in the control space to reset the objects to their original positions in the display space.

In the case of a touch sensitive screen, the reference point position may be made dependent on a user's first point of touch.

The algorithm and/or heuristic to determine a new control weight for each object may include a forgetting function whereby the control weight of an object may be increased or reduced as a function of time or navigation distance.

The method may include the step of interpreting a first touch on a touch-sensitive screen as a typical GUI object selection, after the pointer object position is out of range in the control space or if the pointer object cannot be tracked, such as when a finger is lifted from a touch-sensitive screen.

The unique control space sector in relation to the control position of each object may radiate and extend past the boundary of the convex space turning approaches to points on the boundary from the inside of the convex space into symmetrically reflected approaches from the outside of the convex space.

The algorithm and/or heuristic to determine a new object control position for each object may translate those positions, including those approaching the pointer position, in such a way that the positions will remain on the boundary of a convex space.

DETAILED DESCRIPTION OF THE INVENTION

The invention is now described by way of four examples with reference to the accompanying drawings.

Example 1. Recursively Decreasing the Control Space Allocation of the Most Distant Object Having a Positive Remaining Allocation In this first example of the invention, the method for dynamic user control over the layout of a graphical user interface includes the step of receiving a description of the initial control space allocation. When initialization is complete, reception of the user point position is started and continued throughout. The resulting trajectory of the user point is subjected to at least two different types of interpretation, affecting control and display respectively.

The invention is illustrated using a touch screen device such as a tablet computer, well known in the art, where the input hardware and the output hardware are mutually configured in such a way that the control space and the display space are physically aligned and merged into a single plane. Such a configuration eliminates the indirection which exists e.g. in the case of mouse control, and it is not an essential part of the invention. While the control and display spaces on a touch screen may appear indistinguishable to the user, they are functionally distinct, and for clarity they are therefore shown separately in the accompanying diagrams.

Setting the Scene

Figure 3:
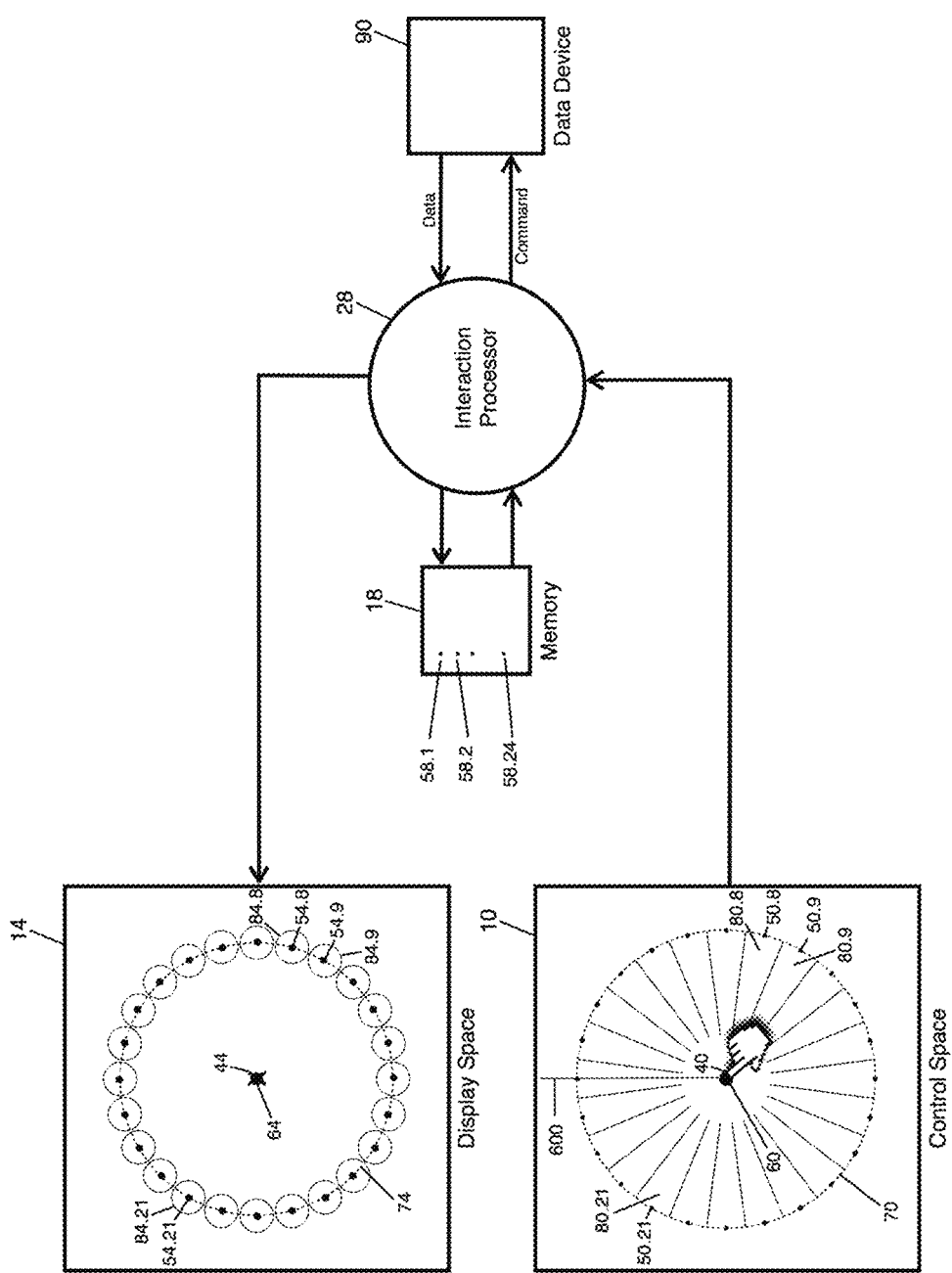
FIG. 3 is an example conceptual diagram of a control space and a display space.

Referring to FIG. 3, the processor 28 requests and receives data from the data device 90, including the number N and various particulars of the currently relevant data objects. These data objects are represented and made available for interaction by the data device 90, and may be text, sound or image files with associated data like the file name, origin and creation time. The value of N in this example is twenty four, but the number is adjustable to suit the data, and using this method to interact with 200 objects is not unusual.

In the computer memory 18, the processor 28 establishes virtual data objects 58.1, 58.2, etc, to 58.24, corresponding to the data objects made available by the data device 90. Every object 58.$i$, with i ranging from 1 to N, is an instance of some class with properties which may include object content, name, origin and creation time, as well as display image, display position, display size, control position and control weight. Some of these properties are derived from the data device 90, while others are to be allocated by the processor 28. The objects 58.$i$ are rearranged or indexed as is convenient, for example alphabetically according to file name, or in sequence according to the creation time.

The control weight property $C_i$ of each object 58.$i$ is a non-negative number interpreted as the claim that the object's control functions collectively have on the available region of control space, relative to that of all the N objects. The control weights in this example constitute the memory in the system that is essential for the adaptation of the pointing advantage associated with each object. The control weight $C_i$ of each object is initialized to some value, which is taken as 1 for all objects in this example. Alternatively, the initial control weight $C_i$ for each object 58.$i$ may be calculated based on a priori information provided by the data device.

The normalized control weight value $c_i$, where $$c_i = \frac{c_i}{\Sigma c_j}, \quad (1)$$

is used to allocate the size of an angular range $\Delta\theta_i(c_i)$ in control space 10 to each object 58.$i$, in such a way that the sum of the control space angular ranges over all N objects equals a full circle of $2\pi$ radians: $\Sigma\Delta\theta_i=2\pi$.

A reference point or origin 60 is established in the control space 10, in this example close to the centre of the space, and also a reference line 600, passing through the origin 60. A circle 70 of convenient radius R centred on the origin 60 is established as well. Starting with the first object at the reference line 600, which is chosen at 12 o'clock in this example, and proceeding clockwise, a wedge shaped segment 80.$i$ of the control space is allocated to each object 58.$i$, with the angular range of segment 80.$i$ equal to $\Delta\theta_i$ as calculated above. The sizes of the segments 80.$i$ will thus be proportional to the control weights $C_i$. In FIG. 3, the three segments 80.8, 80.9 and 80.21 are explicitly labelled, but twenty four of them can be counted.

The normalization of control weights $c_i$ in equation (1), combined with the described control space allocation method, guarantees that there will be no overlap between any two segments 80.$m$ and 80.$n$ if m and n are different, and that the N segments 80.$i$ together will exactly cover the disk inside circle 70. It follows that every direction from the origin 60 is associated with a single uniquely identifiable object 58.$i$ via its segment 80.$i$. The circle 70 partially bounds each segment 80.$i$ with a circular arc, and the midpoint of each such arc is established as the position 50.$i$ in control space of the associated object 58.$i$.

The processor 28 establishes a linear mapping L from the control space 10 to the display space 14 (i.e. a CD function), defined in such a way that the circle 70 in control space 10 is mapped to a circle 74 in display space 14, and that the two circles 70 and 74 occupy exactly the same position on the face of the touch screen device. The processor 28 uses the mapping 5L to establish a reference point 64 in the display space 14 as the image of the origin 60 in the control space 10. The control position 50.$i$ of each object is also used as the argument to the mapping L to establish a position 54.$i$ in display space 14.

If the control weights $C_i$ of all objects 58.$i$ are initialized to the same value as is done in this example, the control positions 50.$i$ will be uniformly distributed around circle 70. Due to the linearity of the mapping L, the display positions 54.$i$ will also be uniformly distributed around circle 74. Equal weights are not necessary however, and any initial distribution of control weights over objects may be employed. In general, the curve 70 on which the control positions 50.$i$ are placed also needs not be circular, but it has to be the boundary of a convex space to preserve directional uniqueness of object positions.

The display size properties of all objects 58.$i$ are initialized to the same value in this example, calculated to fit the number of objects around the circumference of the circle 74. The visual representation of each object 58.$i$ is then accomplished by establishing a pixel object 84.$i$ around the corresponding display position 54.$i$ in display space 14. The pixel object 84.$i$ may be based on a generic image, or on the display image property of the object 58.$i$. The pixel objects 84.$i$ may take any convenient shape, but they are simply shown as circles in this example.

Input and Feedback Output

The method further includes the step of receiving the position of a user point, a person's finger 40 in this example, with respect to the origin 60 in the touch sensitive control space 10. The distance $R_p$ from the origin 60 to the current position of the pointing object 40 and the angle $\theta_p$ measured clockwise from the reference line 600 to the line connecting the origin 60 to the pointing object 40 are determined, and together they constitute orthogonal polar coordinates ($R_p$, $\theta_p$) of the pointing object in control space.

The interaction processor 28 also establishes a pointer 44 in display space 14 corresponding to the pointing object 40 in control space 10. It calculates and continually updates the position of the pointer 44 with respect to the reference point 64, using the linear mapping L and the pointing object position as its argument.

A trajectory of the pointing object 40 may be established in the memory 18, represented as a sequence of pointing object positions together with the time at which each position was determined.

Control space coordinates referred to the origin 60 will be called absolute, while coordinates with respect to the changing position ($R_p$, $\theta_p$) of the pointing object 40 will be called relative. Once the tracking of the pointing object 40 has started, the relative distances $R_{ip}$ and angles $\theta_{ip}$ of all object control positions 50.$i$ are calculated and continually updated.

New values of the control weights $C_i$ are calculated using a control weight function or algorithm based on the absolute distance $R_p$, which is one of the coordinates of the pointing object, in the way described below. This change in the weights $C_i$ triggers an update in the size of the control space angular range $\Delta\theta_i$ of each object, and consequently in the size of the object segments 80.$i$.

From a relative point of view, changing the sizes of the object segments 80.$i$ may be interpreted as the distortion of the control space 10, where a position dependent and time changing distortion function may account for all the changes in segment sizes. In this sense, the user is enabled to control the distortion of the control space 10 by radial movement of the pointing object 40.

The updated placement of each new segment depends on the absolute angle $\theta_p$. The current angle $\theta_p$ can always be associated with a unique object called the focus object, say 58.$n$, via its circular segment 80.$n$, as pointed out above. For updating the placement of all the object segments 80.$i$, the line specified by the angle $\theta_p$ inside control segment 80.$n$ is kept fixed as an anchor point, and the size of the focus object's segment 80.$n$ is first adjusted around this line to its new range M. Then the sizes of its neighbouring segments 80.($n$−1) and 80.($n$+1) are adjusted and placed such that there is no angular gap between the segments. Placement proceeds in this way with neighbouring segments in both directions until all segment sizes are proportional again to the new corresponding values of control weight $C_i$.

Alternatively, the current control position 50.$n$ of the focus object can be kept fixed as the anchor point and the size of segment 80.$n$ can be adjusted around this line to its new range $\Delta\theta_n$, before the other segments are scaled and placed around it.

Changing which object is in focus is determined by the angle $\theta_p$, which is another coordinate of the pointing object, orthogonal to $R_p$. Therefore, the user is enabled to control pointing or navigation between objects in the control space 10 independently from distortion, by transversal movement of the pointing object 40.

The changes in control space described above are propagated to the display space 14, via the linear mapping L, resulting in a repositioning of the pixel objects 84.$i$. In the case of overlap, the focus object 84.$n$ is displayed on top of the visual stack. Another function or algorithm based on the relative distances $R_{ip}$ may be used to independently adjust the sizes of the pixel objects 84.$i$, typically increasing the sizes of objects closer to the pointer 44 and decreasing the sizes of further ones.

If correctly coordinated, the changes in the control and display spaces may cause the visual representations of closer objects that initially overlapped partially to move apart until they no longer overlap, and are more clearly visible in display space, in addition to being easier to select in control space.

Two extreme cases illustrate the inverse relationship between rate of navigation and ease of acquisition. For values of $R_p$ close to zero, a very high rate of navigation may theoretically be achieved, since traversing the smallest circle around the origin will allow ranging through all possible angles. The ease of acquisition with respect to any object is very low however, since the objects are packed very closely together around the circle 70, and acquisition under these conditions requires an inordinate accuracy in manipulating the pointing device 40. In addition, there are practical limits to the determination of the pointing device position.

For values of $R_p$ approaching the radius R of circle 70, the ease of acquisition is very high with respect to nearby objects, as their control segments 80.$i$ have expanded significantly. At the same time, the rate of transversal navigation to remote objects is low, as the growth in nearby segments moved all control positions 50.$i$ to more distant angles. Some objects may even be completely inaccessible purely by transversal movement, as their control weights $C_i$ have been reduced to zero, causing their control segments 80.$i$ to vanish.

The advantage of this method is that the user is not limited to these extreme cases, but may change $R_p$ to take all values intermediate between 0 and R. This enables seamless position dependent control of the trade-off between rate of navigation and ease of acquisition, while continually providing visual feedback about the progress of the interaction, including navigation and acquisition.

The Control Algorithm

For changing the trade-off between rate of navigation and ease of acquisition, some form of memory of the trajectory history is essential. It need not retain much detail, but without hysteresis, only visual advantage adaptation is possible.

In order to enable interaction with a large number of objects, the functions mapping absolute pointing object position ($R_p$, $\theta_p$) to changes in control weight $C_i$ should be strongly non-linear and preferably exponential, although linear functions may be used in the case of a small number of objects. In this example, the decision was made to separate the non-linearity and some of the hysteresis effects into separate functions.

For convenience, the radial coordinates are normalized with respect to the radius R of the circle 70:

$$r_p = \frac{R_p}{R}, r_i = \frac{R_i}{R}, r_{ip} = \frac{R_{ip}}{R}$$

Starting then with the current normalized absolute distance $r_p$ of the pointing object 40 in control space 10, a global reduction function $v_p$ is defined as a product exponential:

$$v_p = r_p e^{1-r_p} \quad (2)$$

Close to the origin 60, the absolute direction $\theta_p$ can change appreciably without much movement in pointer object. A small disk with normalized radius $r_k$ is introduced, inside of which the control weights remain unchanged. This modifies expression (2) to the form given in the following equation:

$$r'_p = \frac{r_p - r_k}{1 - r_k} \quad (3)$$

$$v_p = r'_p e^{1-r'_p}$$

Figure 1:
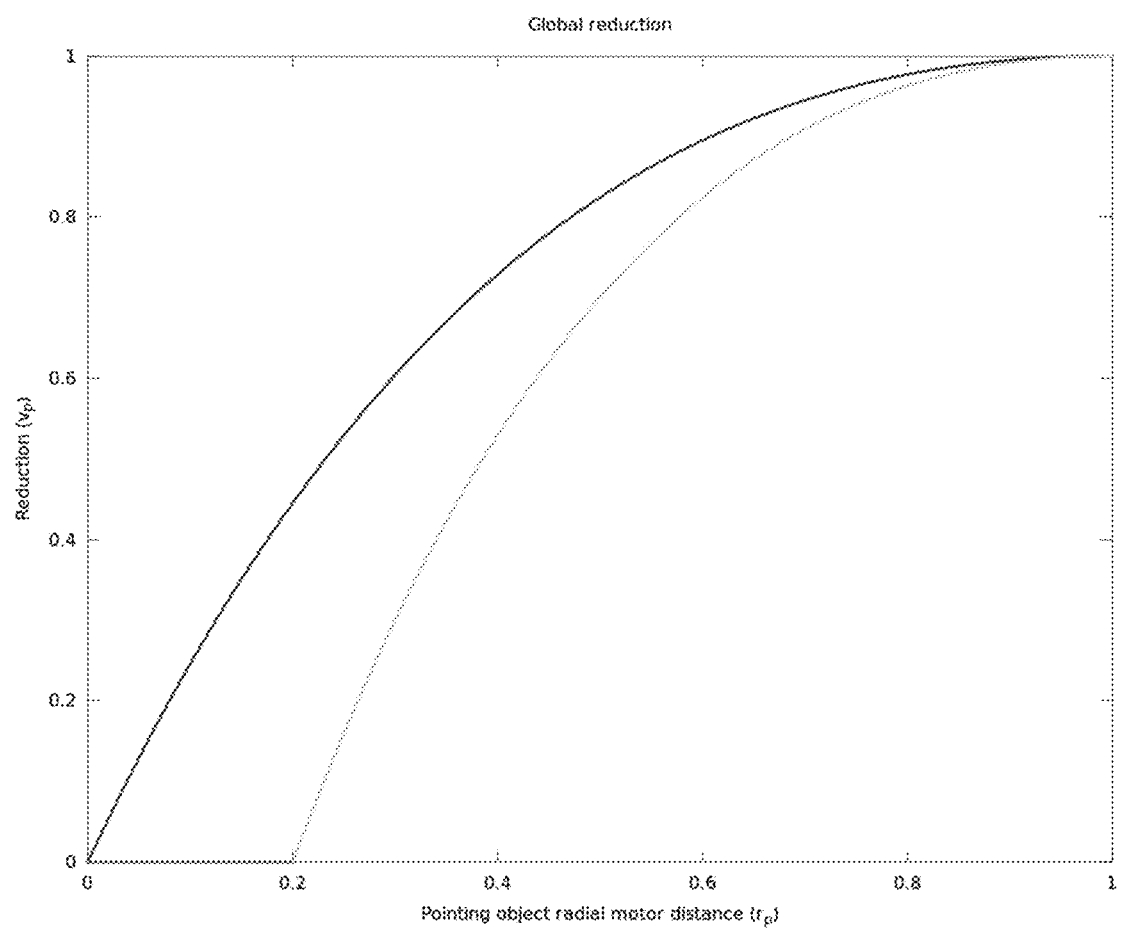
FIG. 1 is an example of two global reduction functions.

These two versions of the global reduction function are shown together on the graph in FIG. 1, with one curve corresponding to equation (2) passing through the origin, and the other one corresponding to equations (3) meeting the horizontal axis in the point 0.2, because $r_k$=0.2. Only one of the two curves is in use at any particular time.

Figure 2:
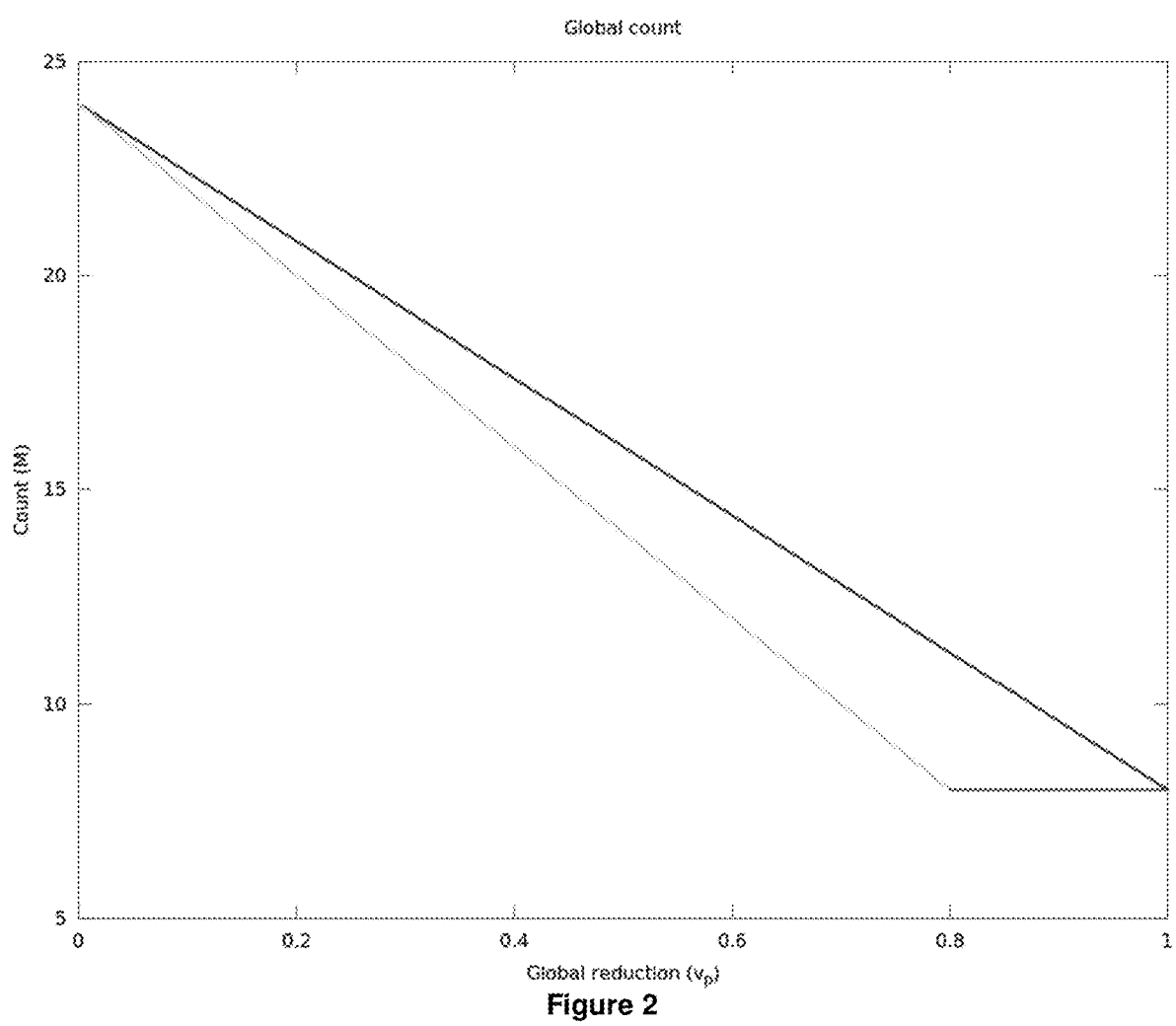
FIG. 2 is an example of a global counter function.

Based on the global reduction $v_p$, a global counter relation $M_p(v_p)$ is introduced. It consists of a triangular hysteresis loop with two adjustable parameters $v_a$ and $N_{min}$. An example with $v_a$=0.8 and $N_{min}$=8 is shown in FIG. 2. The relation $M_p$ decreases only along the upper line and increases only along the lower line of the hysteresis loop. Any change in $v_p$ which falls inside the loop has no effect on $M_p$. Both of the lines shown are needed to define $M_p$.

The algorithm for adapting control weights proceeds as follows. Control weights $C_i$ are assumed initialized, and the previous value of $M_p$ is stored, starting with N. Whenever $r_p$ changes, the corresponding $v_p$ and $M_p$ are calculated from (1)-(3), and also the global count change $\Delta M_p$. The change in global count needs to be allocated to the control weights $C_i$. The current absolute angle $\theta_p$ of the pointing object 40 is used to determine the focus object, say 58.$n$, and also the furthest object, say 58.$k$, keeping in mind that objects 58.1 and 58.24 are neighbours in this example, therefore using modulo 24 arithmetic.

If the global count change $\Delta M_p$ is negative, the control weight $C_k$ of the furthest object 58.$k$ is reduced, and if necessary, recursively those of its neighbours in both directions, to the point where the combined reduction in control weights matches the negative global count change. The minimum control weight of any object is zero, so the sum of all remaining control weights should equal the value of $M_p$ at all times. The lowest global count is limited by the minimum value of the relation $M_p$, i.e. the adjustable parameter $N_{min}$, which is taken as 8 in this example.

The reduction in $M_p$ in this example is concentrated repeatedly on the single furthest object with any weight left, effectively eliminating them one by one from interaction, but it may be allocated more broadly using some function, as illustrated by Example 1a below.

If the global count change $\Delta M_p$ is positive, control weights around the focus object 58.$n$ are increased up to the maximum value of each, until the increase matches the global count change. The maximum control weight value is one, which means that the control weights of all objects will be restored once $M_p$ reaches N again.

The new control weights $C_i$ are used as before during the initialization steps to proportionately allocate angular ranges in control space to the objects 58.$i$. The placement of the new control segments 80.$i$ makes use of the pointing object 40 as the anchor position.

Action Output

A threshold (circle 70 in this example) is established in control space 10. Whenever the processor 28 detects the crossing of the pointing object 40 through the threshold 70 within any disk segment, say 80.n, it sends the command relating to the associated object 58.n to data device 90. If each of the objects 58.i has music as content for example, the command may cause the playing of the selected object 58.n's content. Alternatively, a tap or other gesture may be detected and used to trigger action output.

A further possibility for indicating action output, is breaking touch contact. This "last touch" principle is based on the assumption that the user started the interaction to make something happen. Extra effort should then be required to make nothing happen, such as returning to a safe contact break area near the origin 60. Taking the pointing object 40 out of range anywhere else triggers the action associated with the current focus object 58.n, that is always defined.

Illustration

FIG. 3 shows the finger 40 at the origin 60 in control space 10, resulting in the pointer 44 and reference point 64 therefore coinciding in display space 14. The normalized absolute distance $r_p$ is zero, which implies no change in control weights or control segment sizes or positions from their initial values. The relative control distances $r_{ip}$ are all equal, leading to equal sizes for the pixel objects.

Figure 4:
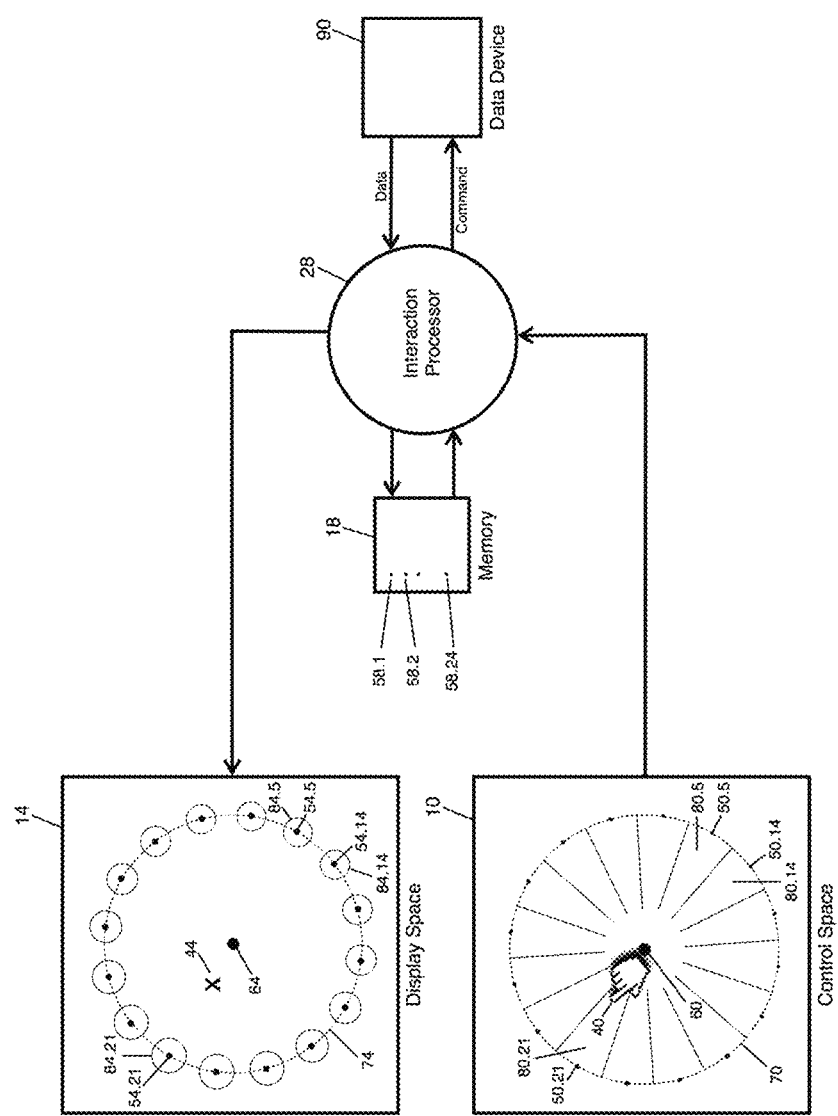
FIG. 4 is an example showing movement of a finger in a control space.

FIG. 4 shows the finger 40 after movement in the direction of the control position 50.21, causing the control weights of the eight objects 58.6-58.13 around the direction opposite to the finger to decrease to zero, which in turn diminishes their control space allocation (i.e. their segments 80.6-80.13) to zero, making them disappear from the display 14 and rendering them temporarily unavailable for selection. The remaining sixteen objects can now claim the whole of the control circle, making their selection easier. Note that the objects 58.5 and 58.14 have become neighbours due to this elimination, in both control and display space, i.e. for all interactional purposes.

Figure 5:
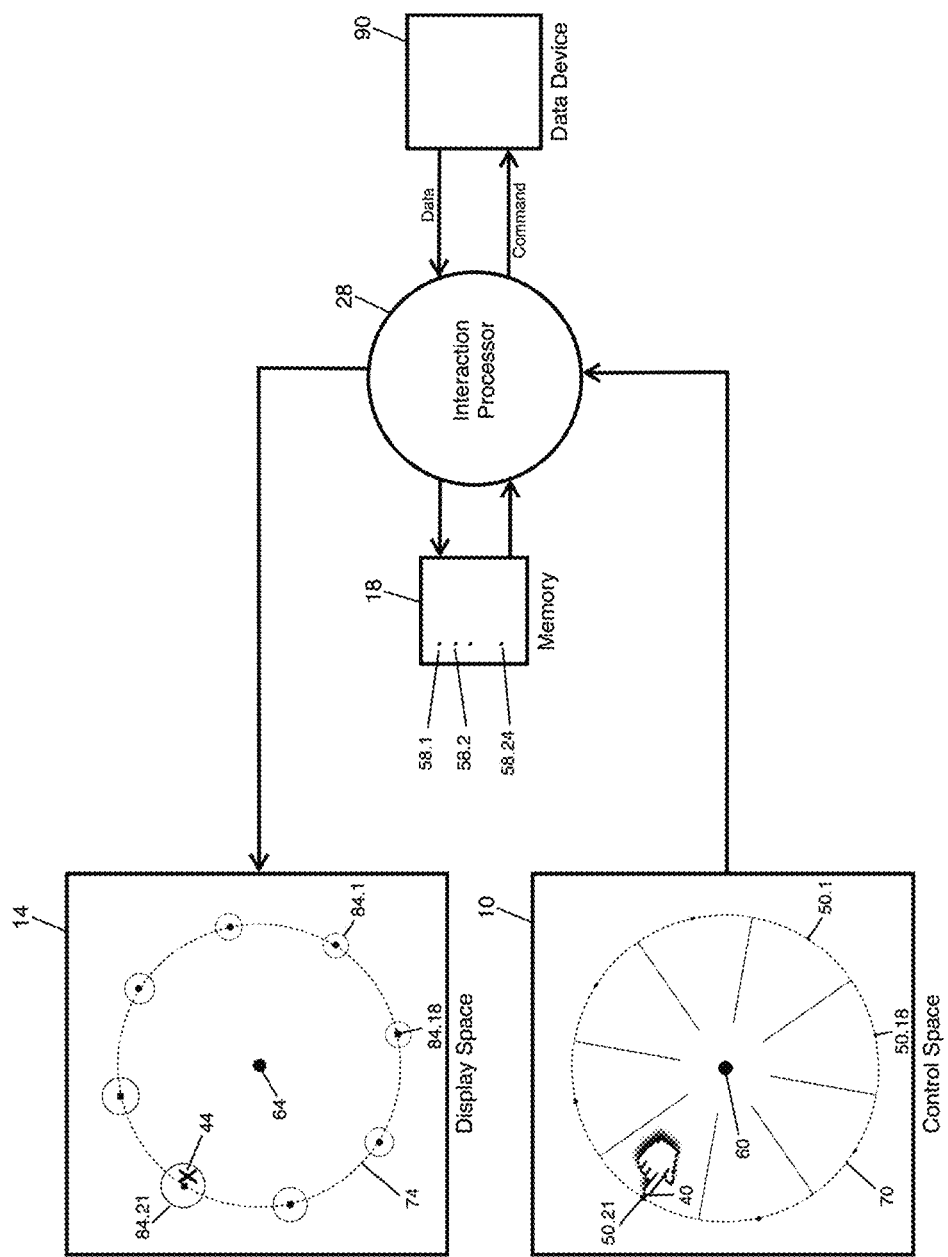
FIG. 5 is an example showing adjustment of objects available for selection in the control space based on movement of a finger in the control space.
Figure 6:
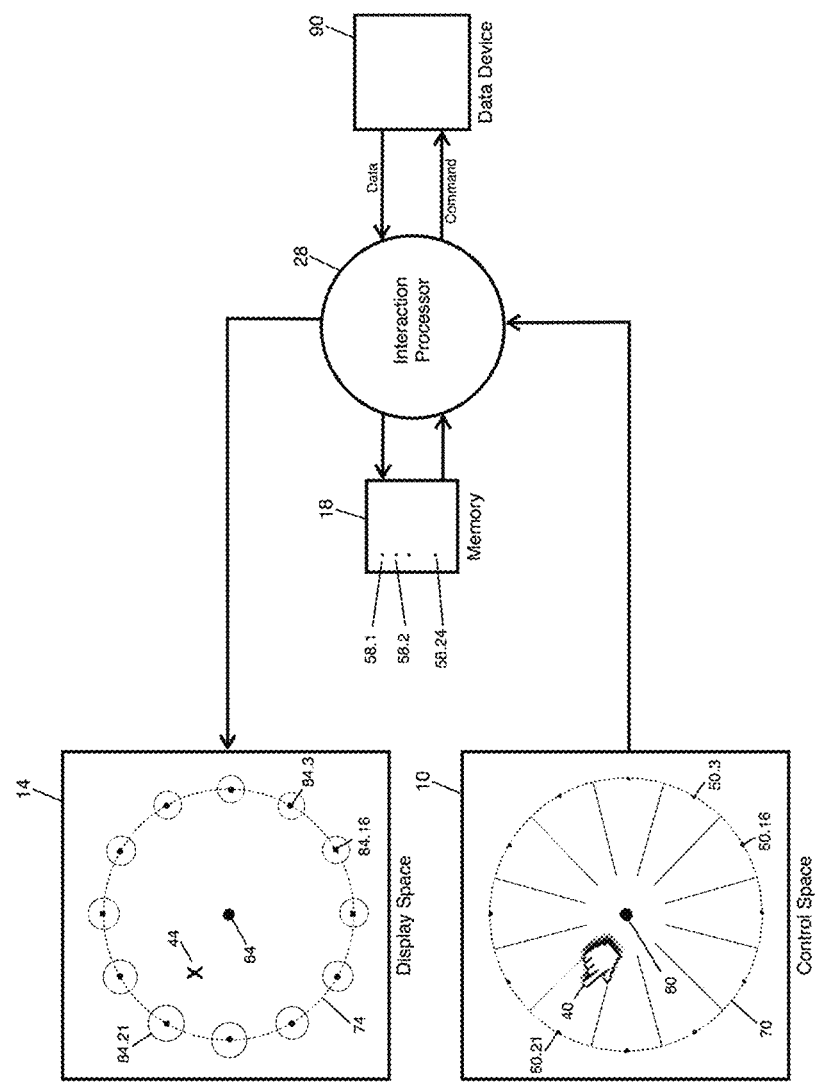
FIG. 6 is an example showing adjustment of objects available for selection in the control space based on movement of a finger in the control space.

Further points along this continuous finger trajectory are shown in FIG. 5 where twelve and FIG. 6 where the selected minimum of eight objects remain available to be selected.

The sequence up to this point has shown radial movement of the pointing object 40 away from the origin 60. Radial movement towards the origin has the reverse effect, namely restoring control weight (and therefore control space) to the previously eliminated objects and simultaneously returning them to the display. Due to the hysteresis illustrated in FIG. 2, the number of available objects is slightly different when radial movement reaches the same point in the inwards and outwards directions.

Transversal movement of the pointing object 40 on a circle of fixed radius centred on the origin 60 does not change the control weights, but it allows navigating to and acquisition of any of the objects remaining on the display.

Movements that combine radial and transversal components have a correspondingly combined effect. Because of the visual feedback provided, this does not confuse the user. The hysteresis mentioned above eliminates jitter due to inadvertent small movements.

The display of the disk at reference point 64 and the pointer 44 may be suppressed to eliminate visual clutter. Conversely, the display of images under the map L of the boundaries of control segments 80.i may be enabled in display space in order to see exactly how the control weights are changing.

The tracking of the person's finger 40 and the resulting updates are performed in real time, so that the sizes and positions of pixel objects 84.i appear to change continuously due to image retention on the human retina. The person thus has the experience of continuously and simultaneously controlling all the pixel objects 84.i by moving his finger 40.

In addition, the user controls the trade-off between rate of navigation and ease of acquisition by radial finger movements. Its history, as remembered by the control weights $C_i$, allows the user to advantageously limit interaction to a small number from the large set of objects 58.i. If desired, this limitation is also easy to reverse at any time, by moving the finger 40 to the vicinity of the reference point 60, thereby resetting the interaction.

In this example, resetting returns every item to its original angular position, independent of the movement history. This has the advantage of recreating a familiar starting point.

Example 1a. Unequal Distribution of the Decrease in Control Space Allocation Over a Range of Objects Around the Most Distant One In Example 1 a method of dynamic user control over the layout of a graphical user interface, thereby controlling the trade-off between rate of navigation and ease of acquisition in a relatively straight-forward manner, was outlined. This example uses the same problem description and methodology described in Example 1.

The difference between Example 1 and this extension, mainly lies within the control weight algorithm, i.e. after the scene was set and methods of input and output have been established. Here, a method is outlined where the reduction of the control space via changes in control weights is distributed over a range of objects instead of concentrated on the most distant object.

The methods for Setting the scene and Input and feedback output are the same as in Example 1, and are hereby incorporated by reference.

Trajectory Interpretation/Reallocation of Control Space

The radial coordinates, $r_p$, $r_i$ and $r_{ip}$ are normalised with respect to the radius of the circle 70, as outlined in Example 1. The formulation of the global reduction function, $v_p$, (with the value of $r_k$ taken as 0.2) and the consequent calculation of the global counter relation $M_p(v_p)$ also remain unchanged.

Control weights $C_i$ are assumed initialized, in this example all control weights are initialised with a value of 1. The previous $M_p$ is stored, initialised with the sum of all initial $C_i$. In the case of this example, the initial $M_p$ is therefore equal to N since all $C_i$ has an initial value of 1. Whenever $r_p$ changes due to user input, the corresponding $v_p$ and $M_p$ are calculated, with the global count change $\Delta M_p$ noted. The change in global count needs to be distributed over the control weights $C_i$. The current absolute angle $\theta_p$ of the pointing object 40 is used to determine the closest object, say 58.n, and also the furthest object, say 58.k, keeping in mind that objects 58.1 and 58.24 are neighbours in this example, therefore using modulo 24 arithmetic.

If the global count change $\Delta M_p$ is negative, the control weights of a range of objects around the furthest object are reduced up to the point where the total reduction in control weights matches the global count change. The minimum control weight for an object is zero, so the sum of all remaining control weights should equal the value of $M_p$ at all times. The lowest global count is the minimum of $M_p$, i.e. the adjustable parameter $N_{min}$, which is taken as 8 in this example.

Consider the control reduction distribution function $c_r(x)$, where x is some point greater than or equal to one, which may be used to determine the maximum allowed reduction of control weight for a specific object 58.$k$. The control reduction distribution function in this example is expressed as:

$$c_r(x) = -exe^{-x} \text{ for } x \geq 1. \quad (1)$$

Figure 7:
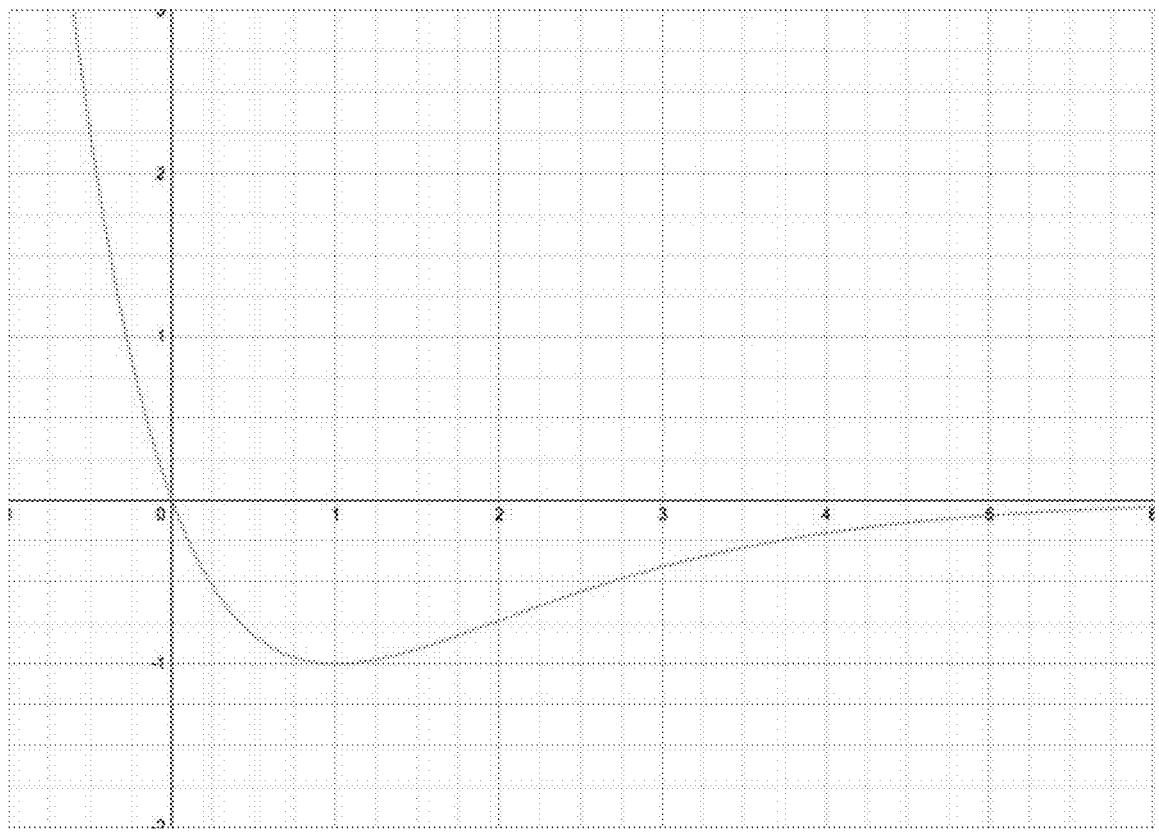
FIG. 7 is an example of a control distribution reduction function.

This function is illustrated graphically in FIG. 7.

When uniformly sampling the function at P points on the interval [1, 4] such that the end points are included, it turns out that $$\Sigma_{i=1}^{P} c_r(x_i) < 2P, \quad (2)$$

at least for 3<P<100 000[1]. This property is used to determine the number of points required to reduce control weights per object in order to possibly satisfy $M_p$. The control weights of a range of furthest objects may be reduced to zero, in a manner similar to that used in Example 1, until property (2) may be applied. It should be appreciated that functions other than (1) may also be used to distribute reduction in control weights, the property expressed in equation (2) is not a requirement for such a function but was convenient for applying function (1) in this specific case.

[1] This inequality was tested numerically.

In the case where a control weight has already been reduced due to previous user input, as much as possible of the calculated $c_r(x)$ is applied. Any value of $c_r(x)$ that cannot be applied, is distributed equally at the end of the algorithm.

If the global count change $\Delta M_p$ is positive, control weights around the closest object 58.$n$ are increased up to a maximum value of each, until the increase matches the global count change. The maximum control weight value is one, which means that the control weights of all objects will be restored once $M_p$ reaches its original value again, in the case of an equal control weight distribution of 1, this is equal to N. It is also possible to use a similar function to (1) to distribute restoration of individual control weights. However, this is not considered in this example.

Action Output

Figure 8:
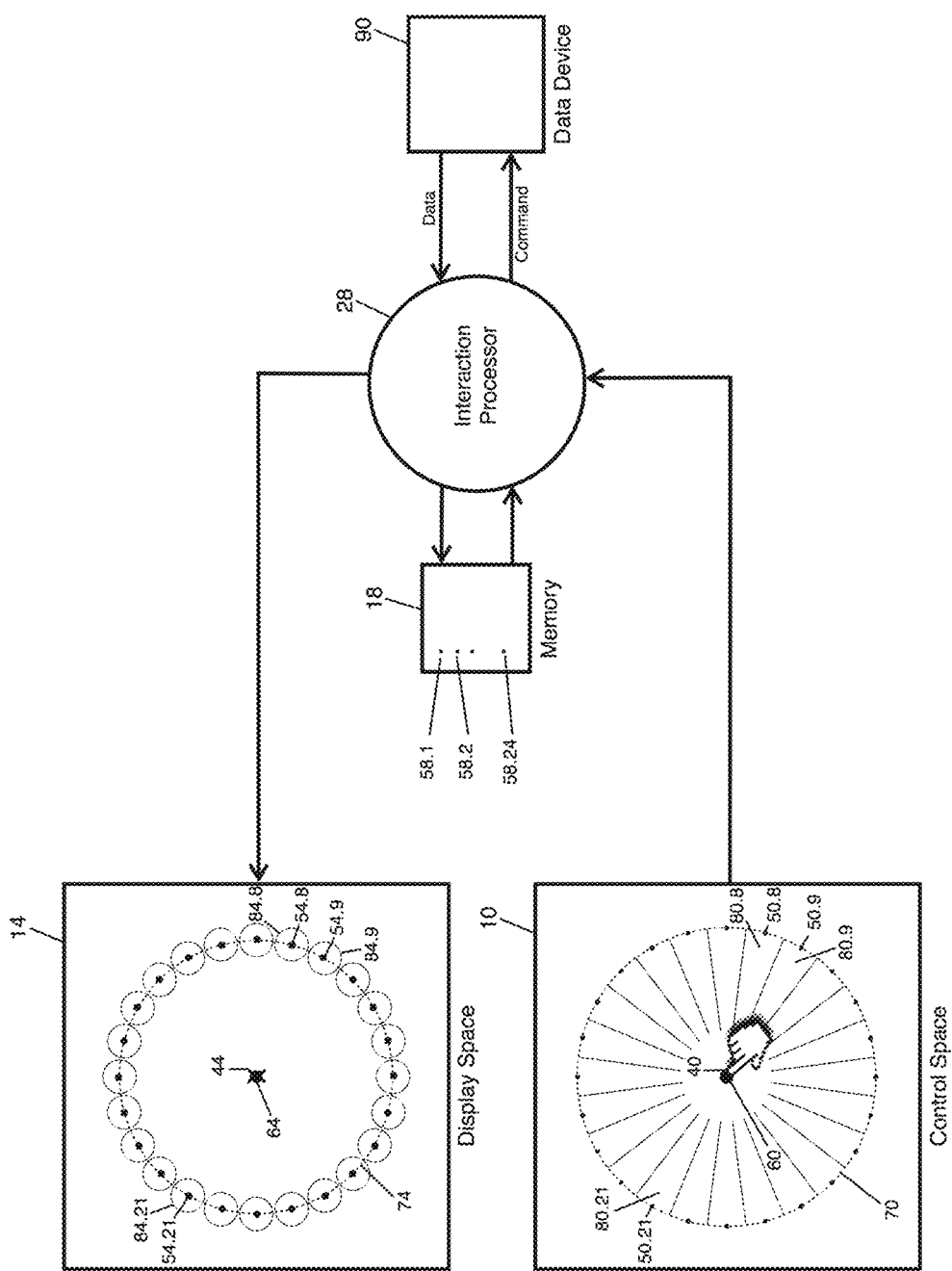
FIG. 8 is an example of a control space including a threshold for selecting an object from the control space.

In FIG. 8, a threshold (circle 70 in this example) is established in control space 10. Whenever the processor 28 detects the crossing of the pointing object 40 through the threshold 70 within any disk segment, say 80.$n$, it sends the command relating to the associated object 58.$n$ to data device 90. If each of the objects 58.$i$ has music as content for example, the command may cause the playing of the selected object 58.$n$'s music. Alternatively, a tapping or other gesture may be detected to trigger action output.

Illustration

FIG. 8 shows the finger 40 at the origin 60 in control space 10, resulting in the pointer 44 and reference point 64 therefore coinciding in display space 14. The absolute distance $r_p$ is zero, which implies no change in control weights or control segment sizes or positions from their initial values. The relative control distances $r_{ip}$ are all equal, leading to equal sizes for the pixel objects. Had the initial control weights been determined a priori, the weights would have already been displayed in the display size of objects at this point.

Consider equation (1), illustrated in FIG. 7. When x has a value greater than one, the value of c(x) conveniently ranges from −1 and approaches 0 as x increases. In the case of negative $\Delta M_p$, values calculated with $c_r(x_i)$ is used to distribute reduction the control weights. Reduction starts at the furthest object with a non zero control weight, which gets assigned the maximum control weight reduction of −1, calculated using the control reduction distribution function (1) at $x_i$=1. The second furthest is reduced using $c_r(x_2)$ and the process is continued for i=1 . . . P or until the change $\Delta M_p$ is satisfied.

Figure 9:
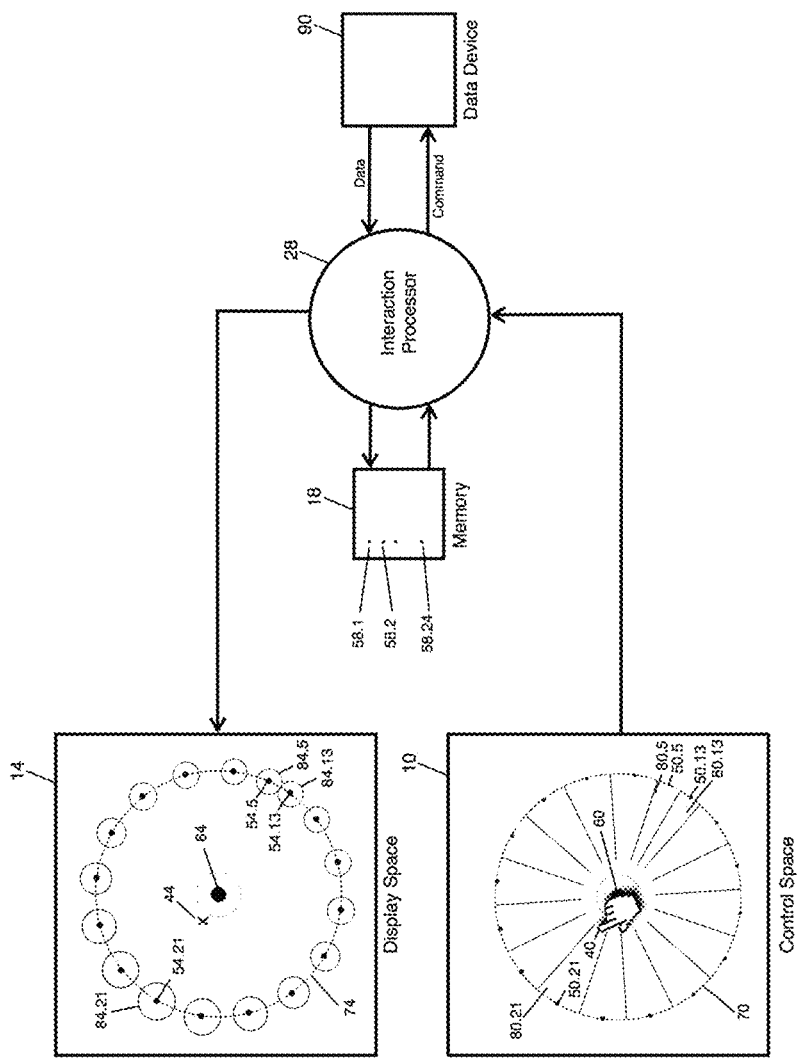
FIG. 9 is an example modifying display of objects based on updated control weights for the objects based on movement of a finger in the control space.

Consider FIG. 9 where the finger 40 moved in the direction of pixel object 58.21, such that $\Delta M_p$=−8 and the total reduction in control weights should therefore equal 8. In this case, after application of the algorithm, 15 of the 24 objects still have their initial control weight of one, two objects have partial weights and seven objects now have the minimum control weight of zero. Only the 17 objects with non zero control weights remain on the display.

Figure 10:
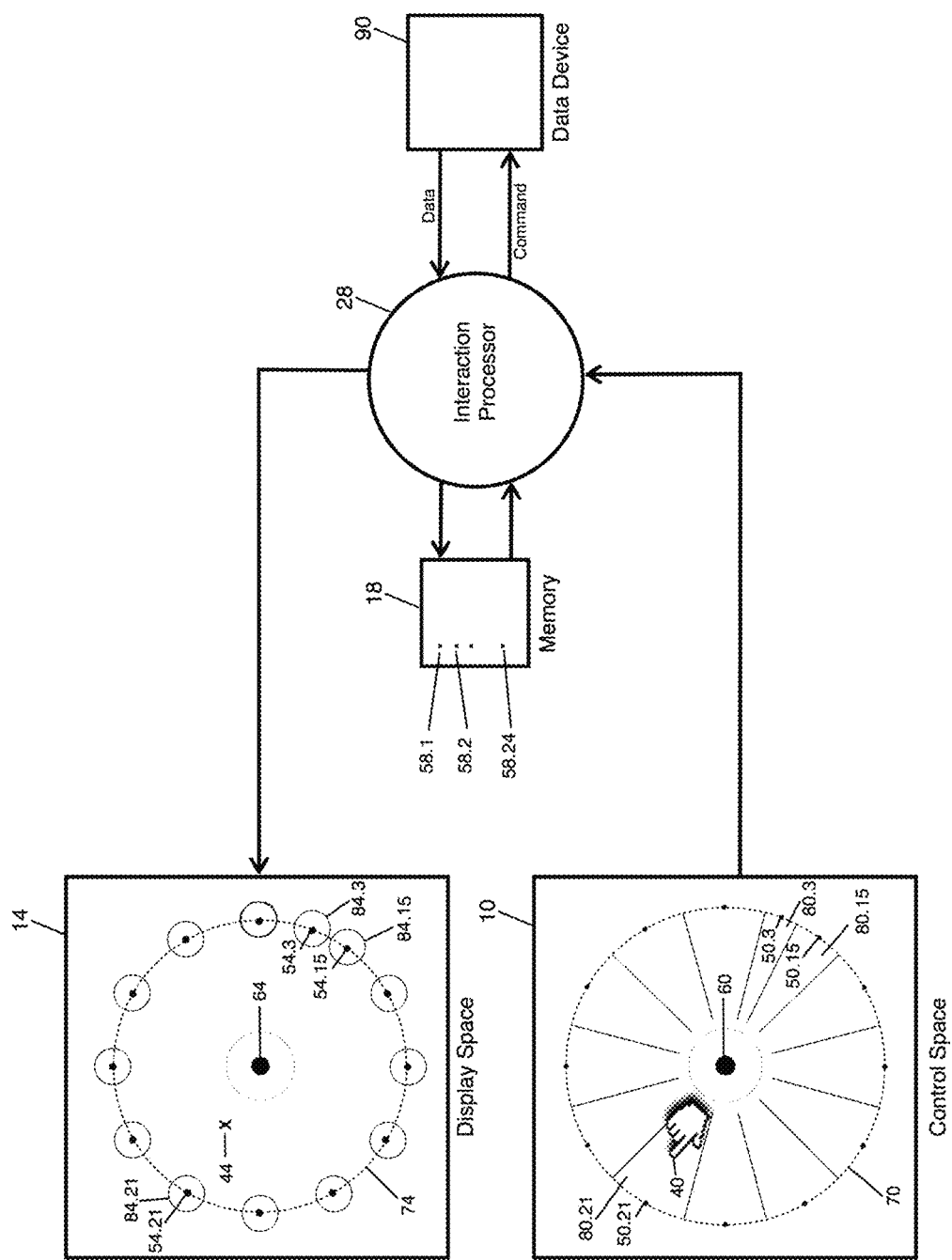
FIG. 10 is an example modifying display of objects based on updated control weights for the objects based on further movement of a finger in the control space.
Figure 11:
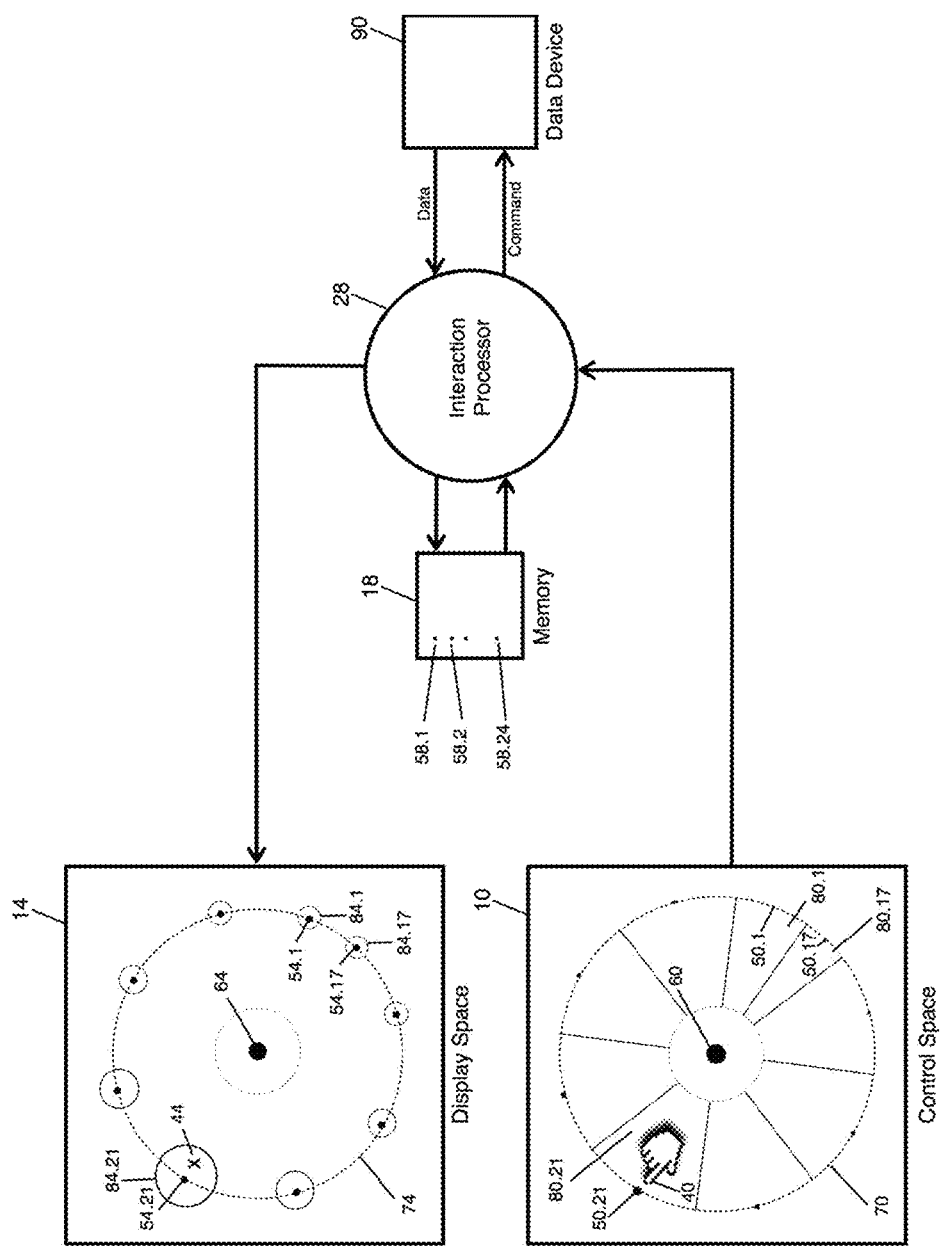
FIG. 11 is an example modifying display of objects based on updated control weights for the objects based on movement of a finger in the control space.

Further points along this continuous finger trajectory are shown in FIG. 10 where there are 11 objects that still have a control weight of one and two objects with partial control weights adding up to a global count $M_p$ of twelve. In FIG. 11 the selected minimum of $M_p$=8 remains with nine objects still visible.

The above sequences have shown radial movement of the pointing object 40 away from the origin 560. Radial movement towards the origin has the reverse effect, namely restoring control weight (and therefore control space) to the previously eliminated objects and simultaneously returning them to the display.

Transversal movement of the pointing object 40 on a circle of fixed radius centred on the origin 60 does not change the control weights, but it allows navigation to any of the objects remaining on the display.

Movements that combine radial and transversal components have a correspondingly combined effect. Because of the visual feedback provided, this does not confuse the user.

The tracking of the person's finger 40 and the resulting updates are performed in real time, so that the sizes and positions of pixel objects 84.$i$ appear to change continuously due to image retention on the human retina. The person thus has the experience of continuously and simultaneously controlling all the pixel objects 84.$i$ by moving his finger 40.

In addition, the portion of control space 10 available for each of the objects 58.$i$ is also controlled by finger 40 movement and its history, as remembered by the control weights $C_i$, allowing the user to limit interaction to a small number from the large set of objects 58.$i$ easing object acquisition. If desired, this limitation is also easy to reverse at any time, by moving the finger 40 to the vicinity of the reference point 60 ("resetting"), allowing an increase in the rate of navigation to distant objects.

Example 2. Continuous Reallocation of Control Space Coordinated with Non-Linear Distortions of Display Space In the next example of the invention, the method for dynamic user control over the layout of a graphical user interface (GUI) again includes the step of receiving a description of the initial control space allocation. Once initialization is complete, reception of the user point position is started and continued throughout. The resulting trajectory of the user point is subjected to at least two different types of interpretation, affecting control and display respectively.

Setting the Scene

Figure 14:
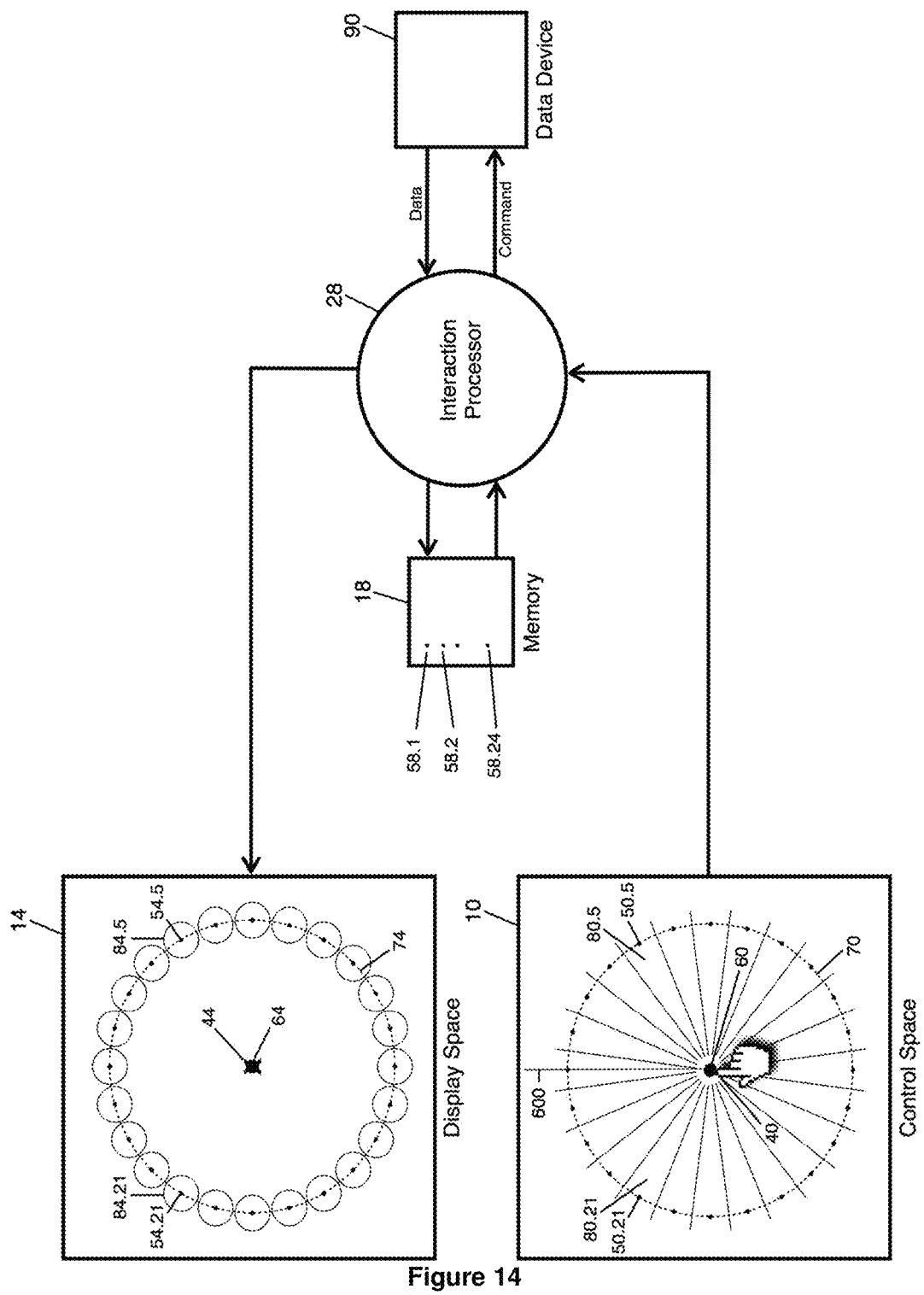
FIG. 14 is an example of a control space with a finger at the origin of the control space.

Referring to FIG. 14, the processor 28 requests and receives data from the data device 90, including the number N and various particulars of the currently relevant data objects. These data objects are represented and made available for interaction by the data device 90, and may be text, sound or image files with associated data like the file name, origin and creation time. The value of N in this example is twenty four, but the number is adjustable to suit the data, and interacting with 200 objects is possible using this method.

In the computer memory 18, the processor 28 establishes virtual data objects 58.1, 58.2, etc, to 58.24, corresponding to the data objects made available by the data device 90. Every object 58.i, with i ranging from 1 to N, is an instance of some class with properties which may include object content, name, origin and creation time, as well as display image, display position, display size, control position and control weight. Some of these properties are derived from the data device 90, while others are to be allocated by the processor 28. The objects 58.i are rearranged or indexed as is convenient, for example alphabetically according to file name, or in sequence according to the creation time.

The control weight property $C_i$ of each object 58.i is a non-negative number interpreted as the claim that the object's control functions have on the available control space, relative to that of all the N objects. Unlike Example 1, the control weights in this example are kept constant throughout the interaction process. The control weight $C_i$ of each object is taken as 1 for all objects in this example.

The normalized control weight value $$c_i = \frac{c_i}{\Sigma c_j} \qquad (1)$$

is used to allocate the size of an angular range $\Delta\theta_i$ ($c_i$) in control space 10 to each object, in such a way that the sum of the control space angular ranges over all objects equals a full circle of $2\pi$ radians: $\Sigma\Delta\theta_i=2\pi$.

A reference point or origin 60 is established in the control space 10, in this example close to the centre of the space, and also a reference line 600, passing through the origin 60. A circle 70 of convenient radius R centred on the origin 60 is established as well. Starting with the first object at the reference line 600, which is chosen at 12 o'clock in this example, and proceeding clockwise, a wedge shaped segment 80.i of the control space is allocated to each object 58.i, with the angular range of segment 80.i equal to $\Delta\theta_i$ as calculated above. The sizes of the segments 80.i will thus be proportional to the control weights $C_i$. In FIG. 14, the two segments 80.5 and 80.21 are explicitly labelled, but twenty four of them can be counted.

The normalization of control weights $c_i$ in equation (1), combined with the described control space allocation method, guarantees that there will be no overlap between any two segments 80.m and 80.n if m and n are different, and that the N segments 80.i together will exactly cover the disk inside circle 70. It follows that every direction from the origin 60 is associated with a single uniquely identifiable object 58.i via its segment 80.i. The circle 70 partially bounds each segment 80.i with a circular arc, and the midpoint of each such arc is established as the position 50.i in control space of the associated object 58.i. The polar coordinates of the point 50.i with respect to the origin 60 are denoted by ($R_i$, $\theta_i$).

The processor 28 establishes a linear mapping L from the control space 10 to the display space 14 (i.e. a CD function), defined in such a way that the circle 70 in control space 10 is mapped to a circle 74 in display space 14, and that the two circles 70 and 74 occupy exactly the same position on the face of the touch screen device. The processor 28 uses the mapping L to establish a reference point 64 in the display space 14 as the image of the origin 60 in the control space 10. The control position 50.i of each object is also used as the argument to the mapping L to establish a position 54.i in display space 14.

The display positions 54.i in this example only receive their initial positions from the linear mapping L of the respective control positions 50.i. Once input is obtained, it will be used to map the points 50.i non-linearly to 54.i (see below).

If the control weights $C_i$ of all objects 58.i are initialized to the same value as is done in this example, the control positions 50.i will be uniformly distributed around circle 70. Equal weights are not necessary however, and any initial distribution of control weights over objects may be employed. In general, the curve 70 on which the control positions 50.i are placed also needs not be circular, but it has to be the boundary of a convex space to preserve directional uniqueness of object positions.

The display size properties of all objects 58.i are initialized to the same value in this example, calculated to fit the number of objects around the circumference of the circle 74. The visual representation of each object 58.i is then accomplished by establishing a pixel object 84.i around the corresponding display position 54.i in display space 14. The pixel object 84.i may be based on a generic image, or on the display image property of the object 58.i. The pixel objects 84.i may take any convenient shape, but they are simply shown as circles in this example.

Input and Feedback Output

The method further includes the step of tracking the position of a pointing object, a person's finger in this example, with respect to the origin 60 in the touch sensitive control space 10. The distance $R_p$ from the origin 60 to the current position of the pointing object 40 and the angle $\theta_p$ measured clockwise from the reference line 600 to the line connecting the origin 60 to the pointing object 40 are determined, and together they constitute orthogonal polar coordinates ($R_p$, $\theta_p$) of the pointing object in control space.

The interaction processor 28 also establishes a pointer 44 in display space 14 corresponding to the pointing object 40 in control space 10. It calculates and continually updates the position of the pointer 44 with respect to the reference point 64, using the linear mapping L and the pointing object position as its argument.

A trajectory of the pointing object 40 may be established in the memory 18, represented as a sequence of pointing object positions together with the time at which each position was determined. For this example, at least the last recorded position of the pointing object is needed.

Control space coordinates referred to the origin 60 will be called absolute, while coordinates with respect to the changing position ($R_p$, $\theta_p$) of the pointing object 40 will be called relative. Once the tracking of the pointing object 40 has started, the relative distances $R_{ip}$ and angles $\theta_{ip}$ of all object control positions 50.i are calculated and continually updated, along with the change in angular coordinate $\Delta\theta_p$ between the current position and the position last recorded.

For convenience, the radial coordinates in control space are normalized with respect to the radius R of the circle 70:

$$r_p = \frac{R_p}{R}, r_i = \frac{R_i}{R}, r_{ip} = \frac{R_{ip}}{R} \qquad (1)$$

In the display space, the radius of the circle 74 is taken as $R_{ds}$. On a touch screen device, $R_{ds}$ equals R.

The display sizes $W_i$ of the pixel objects 84.$i$ are changed to give feedback output to the user, using an inverse power function of the normalized relative control distances $r_{ip}$, as given in equation (2).

$$W_i = \frac{mW_{ui}}{1+(m-1)r_{ip}^q} \quad (2)$$

where $W_{ui}$ is the unmagnified display size of object 84.$i$, m is a free magnification factor and the power q is another free parameter governing the strength of the magnification. It can be seen from equation (2) that objects closer to the pointer 44 than to the centre of the circle 74 will be enlarged, and those further will be diminished.

In addition to changing the display sizes $W_i$, the display positions 54.$i$ of the pixel objects 84.$i$ on the circle 74 are adjusted by changing the relative angles $\varphi_{ip}$ of the points 54.$i$ with respect to the line connecting the reference point 64 to the pointer 44 in the following way.

The current angle $\theta_p$ of the pointing object 40 in control space 10 can always be associated with a unique object, say 58.$n$, via its circular segment 80.$n$, as pointed out above. The object n will then also have the nearest control position 50.$n$ to the pointing object 40, and will be called the focus object.

Figure 12:
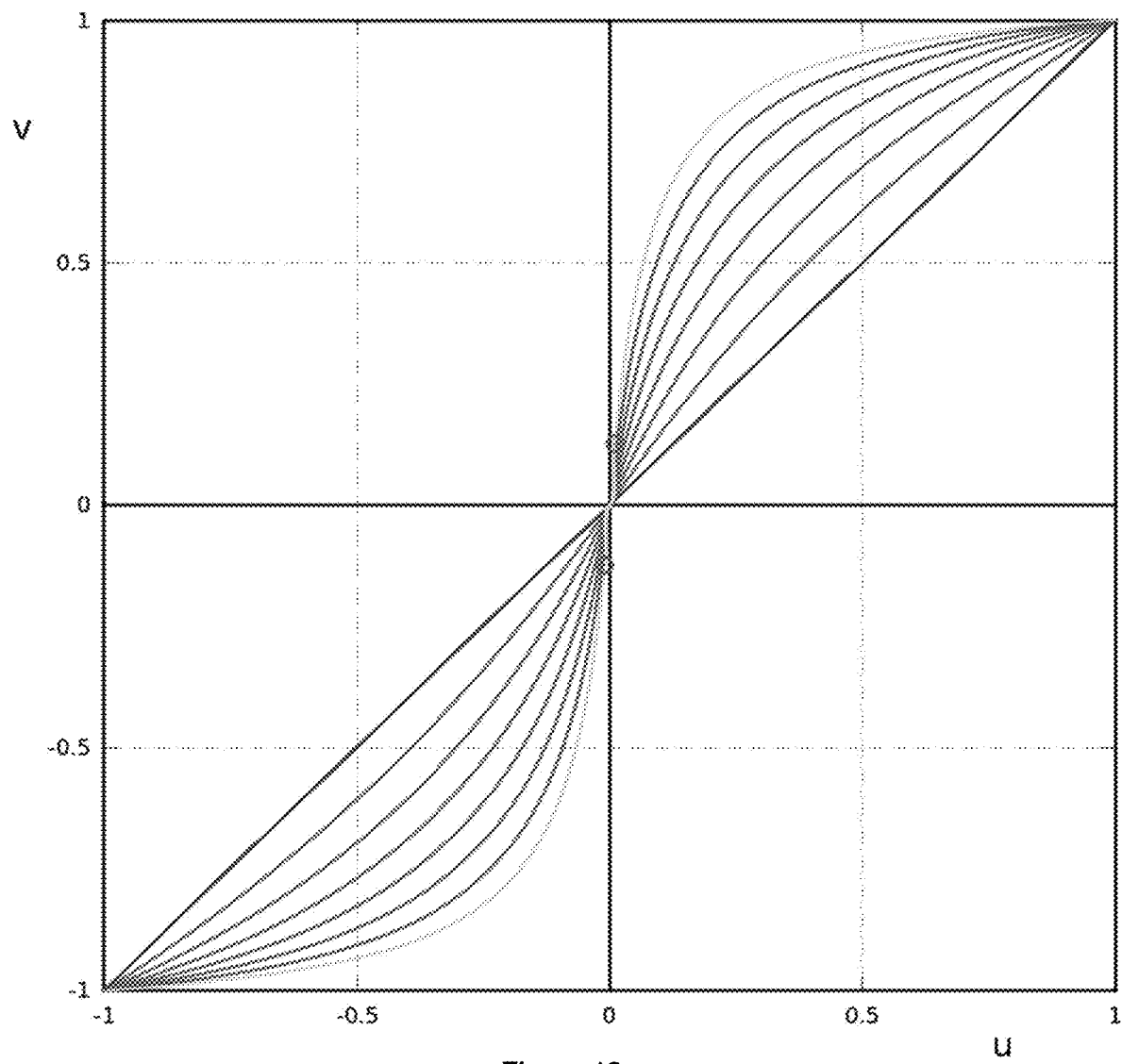
FIG. 12 is an example family of convex-concave transformation functions.
Figure 13:
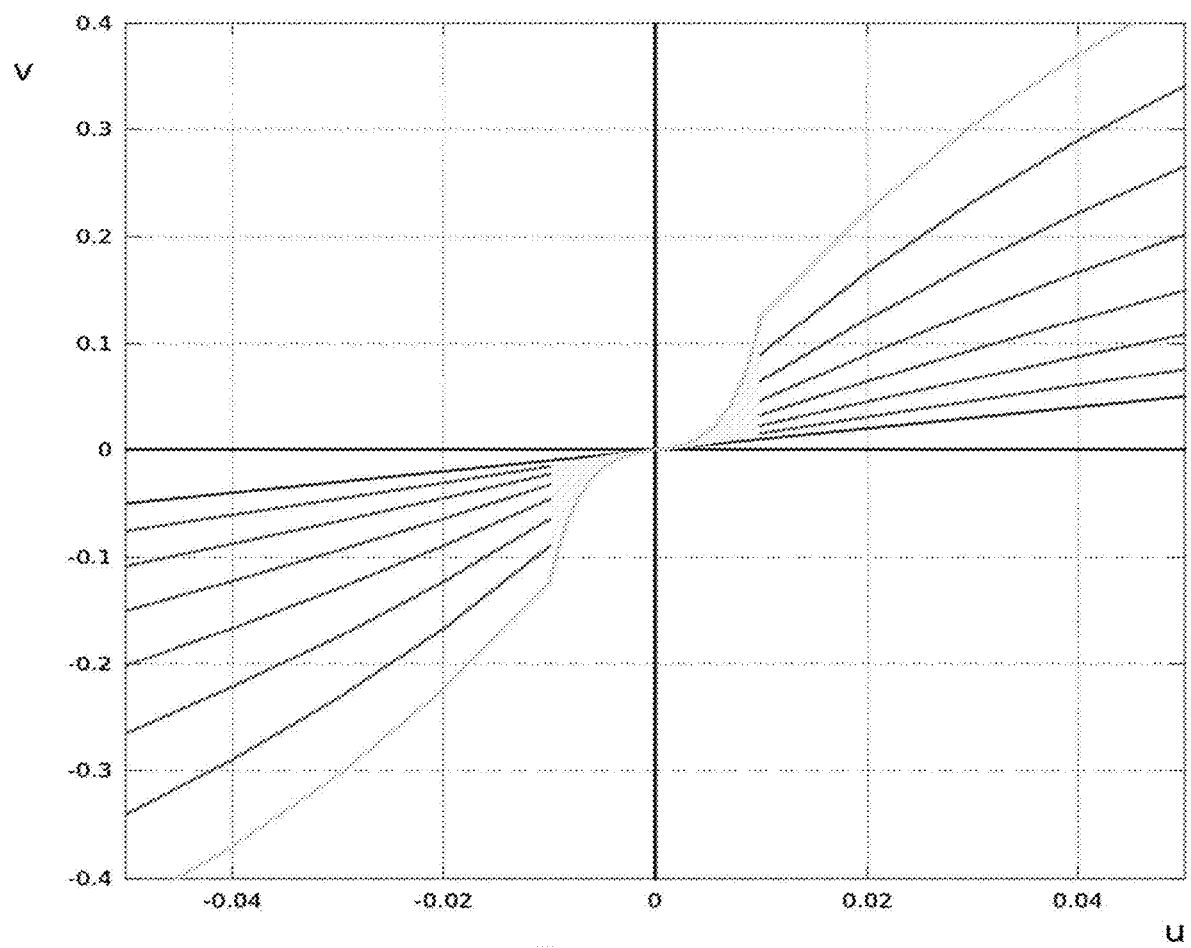
FIG. 13 is an enlargement of the family of concave-convex transformation functions around the origin.

Angular coordinates are normalized with respect to $\pi$ $$u_{ip} = \frac{\theta_{ip}}{\pi} = \frac{\theta_i - \theta_p}{\pi}, \quad v_{ip} = \frac{\phi_{ip}}{\pi} = \frac{\phi_i - \phi_p}{\pi} \quad (3)$$

and care is taken to do the angular arithmetic modulo $2\pi$. The normalized relative control angle $u_{ip}$ can be determined from the tracked coordinates and object control space allocations described above. The normalized relative display angle $v_{ip}$ is then calculated using a two-piece convex-concave transformation function $v_{ip}=f(u_{ip})$, with $$f(u) = \begin{cases} ue^{ku}, & 0 \le u \le \frac{1}{N} \\ \frac{(1+d)u}{1+du}, & \frac{1}{N} < u \le 1 \end{cases} \quad (4)$$

where N is the number of objects, and the parameters k and d can be calculated using $$k = N\log\left(N\frac{W_n}{2\pi R_{ds}}\right) \quad (5)$$

$$d = \frac{NW_n}{1-W_n} \quad (6)$$

where n denotes the index of the focus object referred to above. For negative arguments u, equation (4) is reflected in both axes to give an odd transformation function as shown in FIG. 12. Note that f(u; $W_n$) has become a family of functions indexed by the magnified display size $W_n$ of the focus object. The region near the origin of this transformation function is shown enlarged in FIG. 13, to emphasize the effect of the product exponential in equation (4).

With the normalized relative display angle $v_{ip}$ calculated using (4), $\varphi_{ip}$ and $\varphi_i$ can also be calculated and used to adjust the display positions 54.$i$ of the pixel objects on the circle 74 relative to the angular position 44 of the pointer.

The Control Algorithm

For changing the trade-off between rate of navigation and ease of acquisition, some form of memory of the trajectory history is essential. It need not retain much detail, but without hysteresis, only visual advantage adaptation is possible. The relevant memory in this example, as in Example 1, is the object control positions 50.$i$, which have angular coordinates $\theta_i$. The difference lies in how these coordinates are adapted.

In this example, object angular coordinates $\varphi_i$ in the display space 14 are used to calculate the new values of $\theta_i$ in the control space 10. The display coordinates $\varphi_i$ depend on the strongly non-linear functions given by equations (2) and (4). The control coordinates are updated by $$\theta_i \leftarrow \theta_i + \Delta\theta_{cp}, \quad (7)$$

with the uniform angular displacement of object positions $\Delta\theta_{cp}$ in control space depending on the change in angular coordinate $\Delta\theta_p$ introduced before:

$$\Delta\theta_{cp} = k\frac{\Delta\theta_p}{\alpha}, \quad (8)$$

$$\Delta\theta_p = \theta_p(t) - \theta_p(t^-). \quad (9)$$

Here, t represents the current time, $t^-$ the previous time that the position of the pointing object was recorded and $\alpha$ provides the feedback from the display space to the control space:

$$\alpha = \frac{|\phi_{n+1}(t^-) - \phi_{n-1}(t^-)|}{2}. \quad (10)$$

The factor $\alpha$ represents half the angular distance in display space between the two neighbours of the focus object, as calculated for the last recorded position of the pointing object. Care is needed again to treat objects 1 and N as neighbours.

The dependence of both $\Delta\theta_p$ and $\alpha$ on the previous time step $t^-$ is necessary to prevent positive feedback and the resultant instability in the adaptation of control positions.

The k in (8) is a free parameter governing the strength of the "friction" effect. Its value should not be too large, lest the moving "control ring" 70 stops slipping behind the pointing object 40, and starts to overtake it. Such behaviour may surprise and confuse users.

The effect of adapting the control positions 50.$i$ in this way is to make the selection of the focus object and its neighbours easier, the closer the pointing object 40 gets to the circle 70. Conversely, the selection of far-off objects becomes more difficult. This is the essential trade-off between rate of navigation and ease of acquisition.

The innovation here is that it takes very little movement of the pointing object 40 near the origin 60 to drastically change the focus, implying a high navigation rate, but it becomes progressively more difficult to change the focus (and therefore easier to make a selection around the focus) as the pointing object approaches the circle 70.

Because visual feedback is continually available, the user can start out in roughly the desired direction, and gradually refine the movement of the pointing object 40 in response to the objects that increasingly gain focus and therefore grow larger.

With the right choice of parameter k, it is possible to select any other object 58.*i* with the pointing object 40 moving on a circle close to 70, by changing the pointing object angle $\theta_p$ enough, possibly through many revolutions. This is different from the behaviour of Example 1, where objects are interactively removed from the eligible set.

In both cases, however, a much better strategy for distant navigation would be to return to the origin 2560 from where every object position 50.*i* is equally accessible again.

Action Output

A threshold (circle 70 in this example) is established in control space 10. Whenever the processor 3028 detects the crossing of the pointing object 40 through the threshold 70 within any disk segment, say 80.*n*, it sends the command relating to the associated object 58.*n* to data device 90. If each of the objects 58.*i* has music as content for example, the command may cause the playing of the selected object 58.*n*'s content. Alternatively, a tap or other gesture may be detected and used to trigger action output.

Illustration

FIG. 14 shows the finger 40 at the origin 60 in control space 10, resulting in the pointer 44 and reference point 64 therefore coinciding in display space 14. The normalized absolute distance $r_p$ is zero, which implies no change in display sizes or positions of objects, or resulting changes in control segment positions from their initial values. The relative control distances $r_{ip}$ are all equal, leading to equal sizes for the pixel objects.

Figure 15:
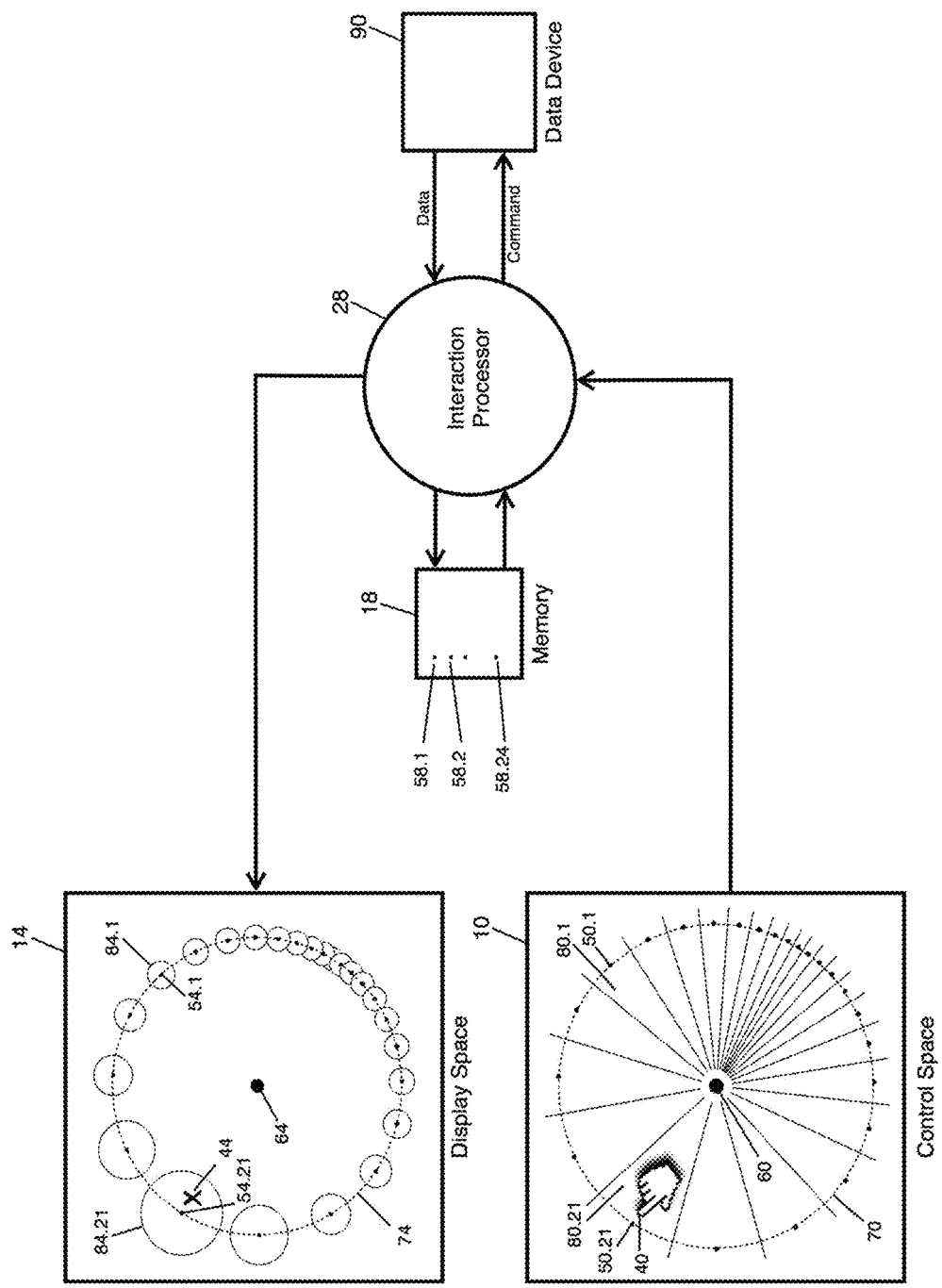
FIG. 15 is an example of an adjustment of objects displayed in a display space based on movement of the finger from the origin of the control space.

FIG. 15 shows the finger 40 after radial movement almost reaching the circle 70 in the direction of pixel object 84.21, making object 21 the focus object. It is clear that the pixel object 84.21 and its neighbours have grown in display space 14, and that the other pixel objects have shrunk. In addition, all pixel objects except that of the focus object have undergone angular displacement on the circle 74, away from display point 54.21. On the opposite side of the circle 74, the pixel objects around 84.9 have started overlapping, even though they are much smaller than before.

Not only has the size of 84.21 grown in display space 14, giving the object a visual advantage with respect to a viewer-user, but the segment 80.21 has been increased in control space 10 as well, giving the object a motor advantage with respect to a selector-user. It is also clear that the increases in visual and motor advantage of object 58.21 and its neighbours are only possible due to the decrease in both advantages suffered by object 58.9 and its neighbours on the opposite side.

Figure 16:
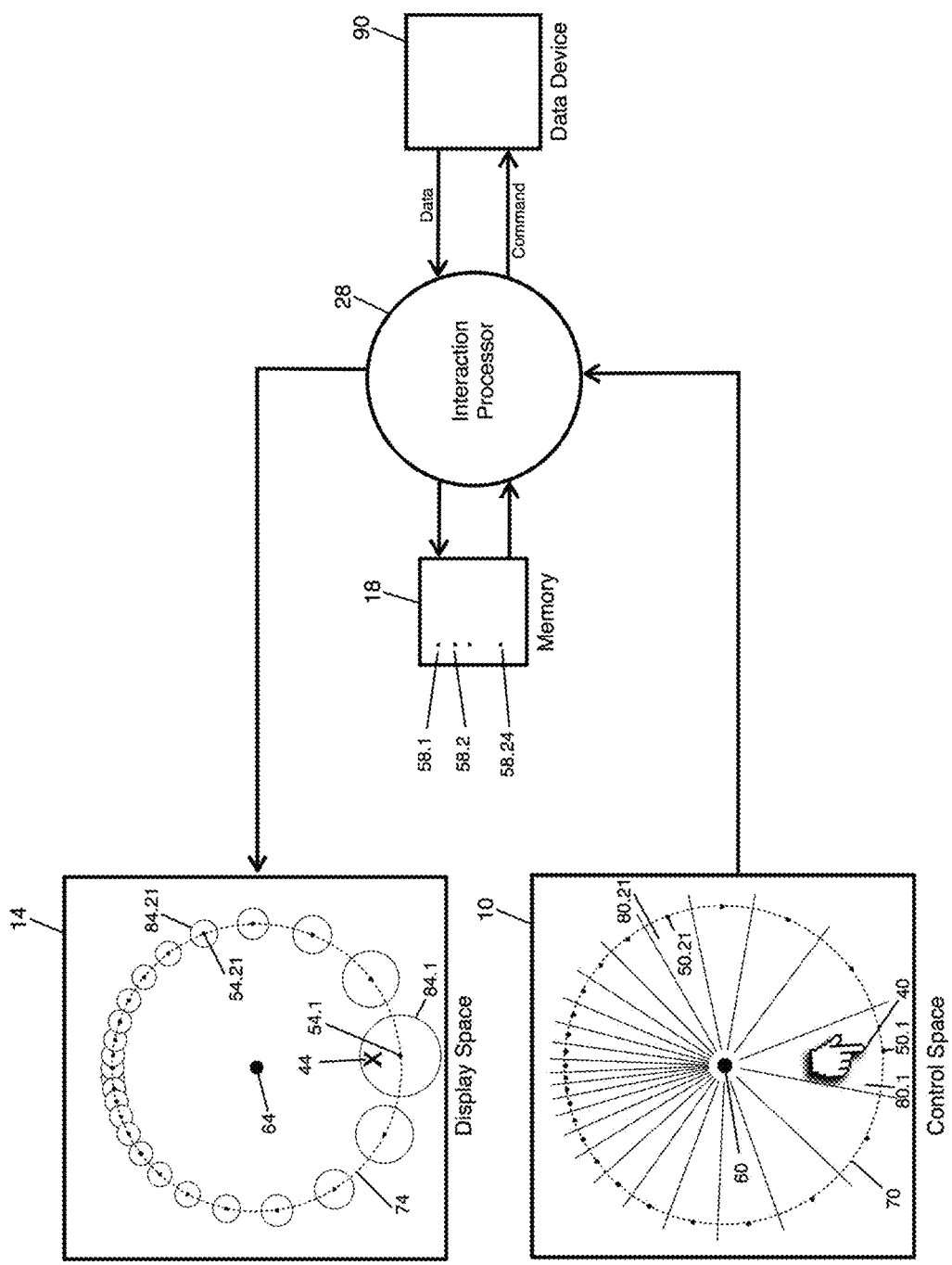
FIG. 16 is an example of clockwise angular movement of the finger through the control space while maintaining a constant radial distance.

FIG. 16 shows the result of clockwise angular movement of the finger 40 through more than half a circle while keeping the radial distance constant, subsequent to the position of FIG. 15. The movement has been extended to the point where pixel object 84.1 is the largest, indicating that object 58.1 has become the focus object, the focus having passed over objects 22, 23 and 24. Note the angular position of 84.1 close to the 6 o'clock position in FIG. 16, significantly removed from the 12 o'clock position where it started in FIG. 14. This shift is indicative of the hysteresis in the system, which is essential for the adaptation of motor advantage.

The fact that object 1 must now be selected at a different angle than where it initially appeared, highlights the loss of fixed positions or angles for objects. This is an unavoidable side-effect of the desired hysteresis. It means that the user needs to rely on visual feedback, and that muscle memory may be of less value.

Figure 17:
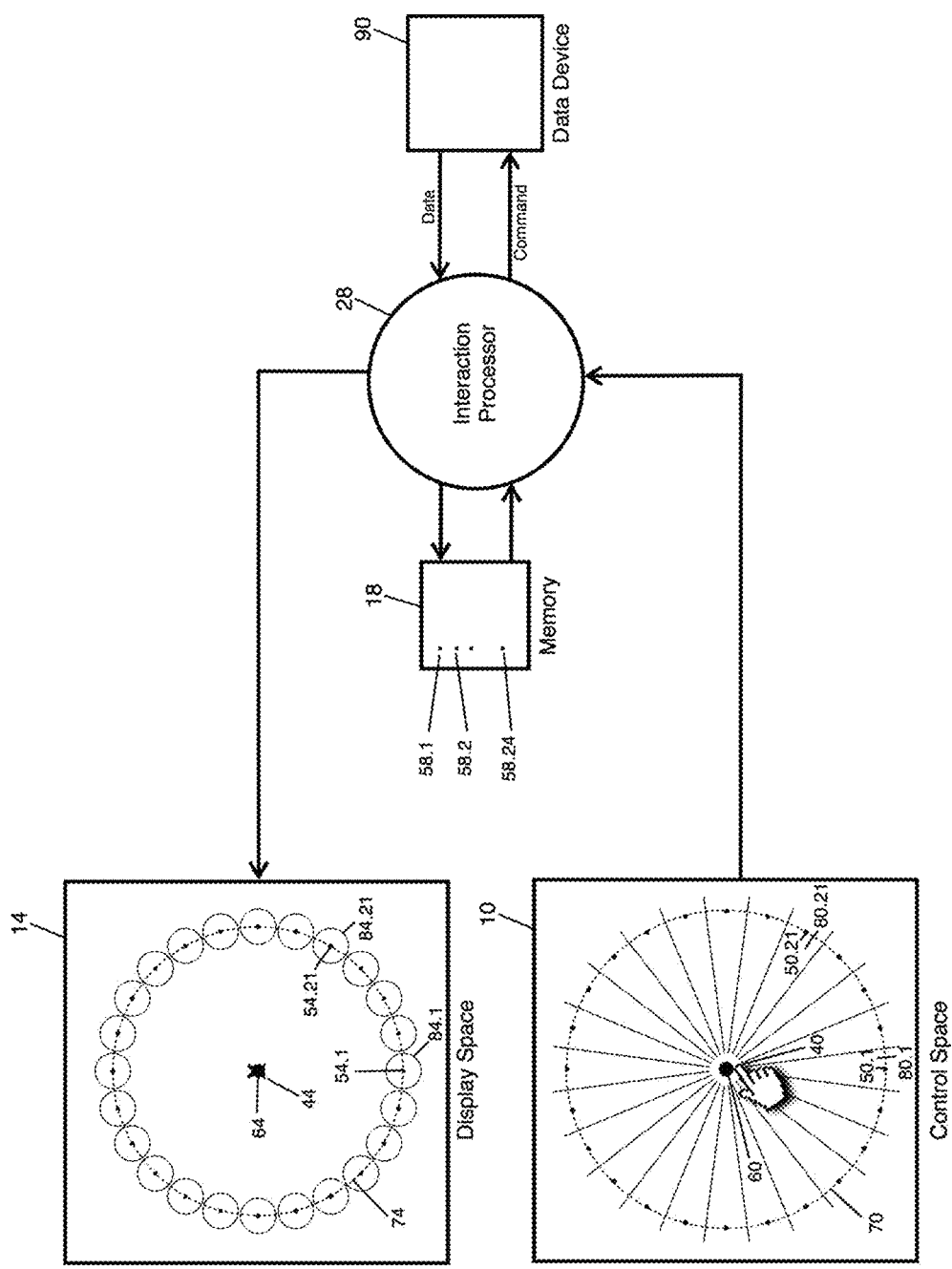
FIG. 17 is an example display of objects after radial movement of the finger to the origin of the control space subsequent to the position of the finger in FIG. E2-5.

FIG. 17 shows the finger 40 at the origin again, as a result of radial movement subsequent to the position of FIG. 16.

All the pixel objects 84.*i* and control segments 80.*i* have returned to an equal size, but the positions are rotated through half a turn.

The display of the disk at reference point 64 and the pointer 44 may be suppressed to eliminate visual clutter. Conversely, the display of images under the map L of the boundaries of control segments 80.*i* may be enabled in display space in order to see exactly how the control weights are changing.

The tracking of the person's finger 40 and the resulting updates are performed in real time, so that the sizes and positions of pixel objects 84.*i* appear to change continuously due to image retention on the human retina. The person thus has the experience of continuously and simultaneously controlling all the pixel objects 84.*i* by moving his finger 40.

In addition, the user controls the trade-off between rate of navigation and ease of acquisition by radial finger movements. Its history, as remembered by the control positions 50.*i*, allows the user to advantageously focus on a subset from the large set of objects 58.*i*. If desired, this focus is also easy to reverse at any time, by moving the finger 40 to the vicinity of the reference point 60.

Example 3. Controlling the Trade-Off Between Rate of Navigation and Ease of Acquisition in the Context of Receding Horizons Recursion In the third example of the invention, the main difference with the foregoing two examples is the assumption that the objects of interest can be accessed by recursive navigation of a tree structure. Every node in a tree except the root node has a parent node, and a node without any child nodes is called terminal. At any time, the user's position in the tree is a single node called the current node. Navigation proceeds from the current node either to its parent node, or to one of its child nodes, if the current node is not the root in the first case, or terminal in the second case.

In the next example of the invention, the method for dynamic user control over the layout of a graphical user interface (GUI) again includes the step of receiving a description of the initial control space allocation. Once initialization is complete, reception of the user point position is started and continued throughout. The resulting trajectory of the user point is subjected to at least two different types of interpretation, affecting control and display respectively.

The method for dynamic user control over the layout of a graphical user interface again includes the step of using an interaction processor 28 (refer to FIG. 19) to receive a description of the initial control space allocation used in setting the scene. A portion of control space 10 is allocated to every control function associated with each child object of the current node object, and a portion of display space 14 to every such child object.

Setting the Scene

The processor 28 requests and receives data from the data device 90 about the contents of the current node object, usually starting with the root node, including the number $N_c$ and various particulars of the currently relevant data objects it contains. All these data objects are represented and made available for interaction by the data device, and may for example be a directory structure containing subdirectories and files, such as text, sound or image files with associated data like the file name, origin and creation time.

In the memory 18 available to the processor 28, an interactive data object 58.*i* is established corresponding to each of the device current node data objects, with i ranging from 1 to $N_c$. Every object 58.*i* is created as an instance of some class with properties which may include content, name, origin and creation time, as well as display image, display position, display size, control position and control weight. Some of these properties are derived from the data device 90, while others are to be allocated by the processor 28. The objects 58.*i* are rearranged or indexed as is convenient, for example alphabetically according to file name, or in sequence according to the creation time.

The normalized control weight property $c_i$ of each object 58.*i* is used as in the previous examples to establish the initial size of an angular range $\Delta\theta_i$ ($c_i$) in control space 10 to each object, in such a way that the sum of the control space angular ranges over all objects equals a full circle of $2\pi$ radians.

A reference point or origin 60 is established in the control space 10, in this example close to the centre of the space. The origin 60 is initially fixed, although its position may change in discrete steps later, due to suitable user interaction to be specified below. A circle 70 of radius R centred on the origin 60 is also established, where R is made not too large, say one fifth of the screen width, to allow for later recursion.

Starting at a reference line 600 passing through the origin 60, taken at 12 o'clock in this example, a definite angular range is allocated to each object 58.*i* in sequence or as indexed. As a side effect, a wedge shaped segment 80.*i* of the circular disk inside circle 70 is also allocated to each object 58.*i*. The sizes of the segments 80.*i* will thus be directly proportional to the control weights $C_i$. The allocation in this example proceeds clockwise.

The normalization given above combined with the control space allocation method, guarantees that there will be no overlap between any two segments 80.*i*, and that the N segments 80.*i* together will exactly cover the disk inside circle 70. It follows that every direction from the origin 60 is therefore associated with a single uniquely identifiable object 58.*i* via its segment 80.*i*. The circle 70 partially bounds each segment 80.*i* with a circular arc, and the midpoint of each such arc is established as the control position 50.*i* of the associated object 58.*i*. The polar coordinates of the point 50.*i* with respect to the origin 60 are denoted by ($R_i$, $\theta_i$).

The processor 28 establishes a linear mapping L from the control space 10 to the display space 14 (i.e. a CD function), defined in such a way that the circle 70 in control space 10 is mapped to a circle 74 in display space 14, and that the two circles 70 and 74 occupy exactly the same position on the face of the touch screen device.

A reference point 64 is also established in the display space 14. The reference point 64 only receives its initial position from the linear mapping L of the origin 60 in the control space 10. Later, during interaction, the position of the display reference point 64 will be allowed to change continuously, and to be different from the image of the origin 60 under the mapping L.

Figure 18:
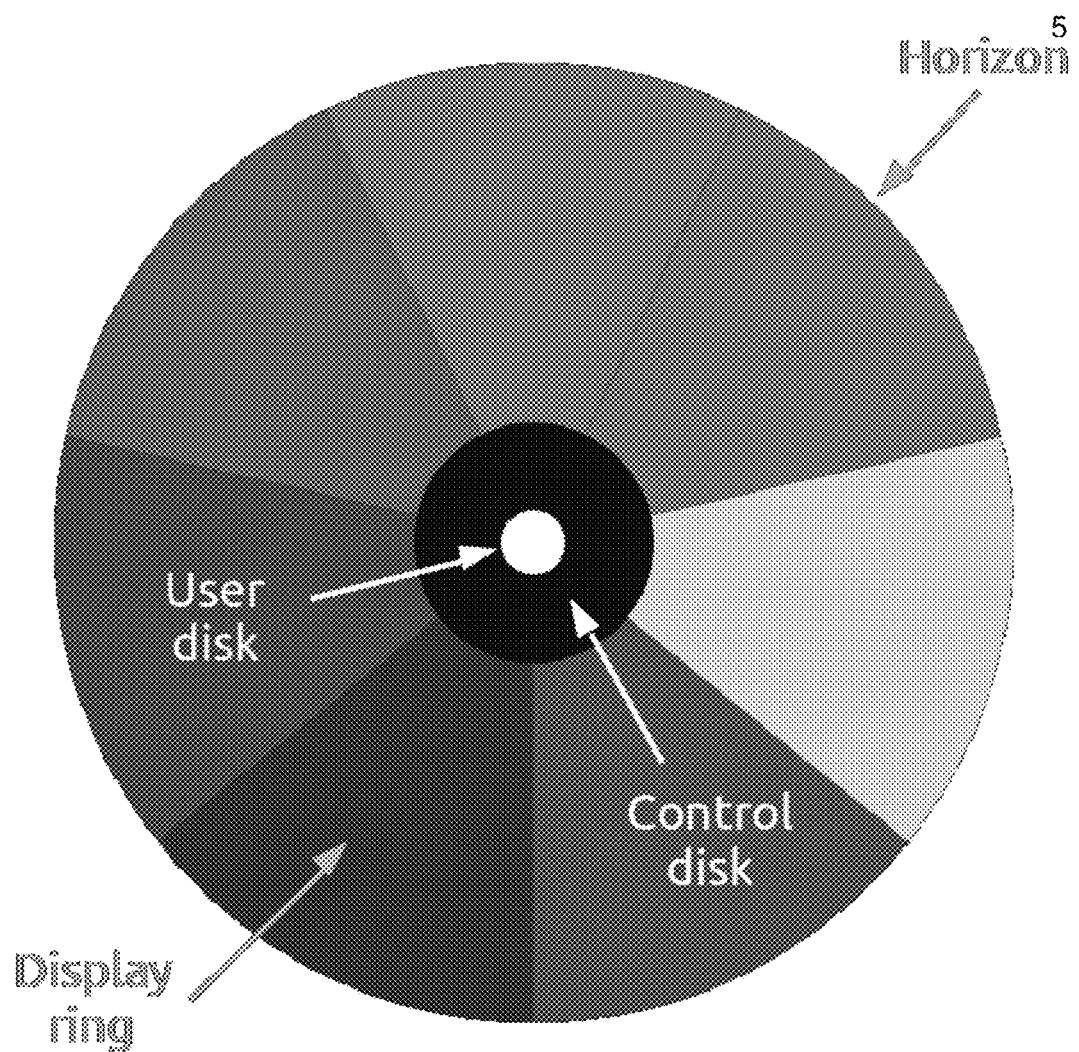
FIG. 18 is an example schematic division of display space during receding horizions recursion.

Another circle 724, referred to as the horizon, is established in display space 14, centred on the reference point 64, with a radius about one and a half to four times that of circle 74. The region between the circle 74 and the circle 724 forms an annulus 714, called the display ring, which can be divided into annular segments by radial lines through the reference point 64. The inside 704 of circle 74 is called the control disk. These areas are shown in FIG. 18, where the pointer 44 is called the user disk.

The display positions 54.*i* are established initially as the images under the mapping L of the control positions 50.*i*. During interaction, the positions 54.*i* may deviate from the images of 50.*i* under the mapping L, as detailed below.

If the control weight $C_i$ of every object 58.*i* is given the same value as is done here, the control positions 50.*i* will be uniformly distributed around circle 70. This is not necessary, however, and any initial distribution of control weight over objects may be employed. In general, the curve 70 on which the control positions 50.*i* are placed, need not be circular, but it has to be the boundary of a convex space to preserve directional uniqueness of object positions.

The visual representation of each object 58.*i* is accomplished by establishing an annular segment 584.*i* inside the display ring, bordering on the corresponding display position 54.*i* which falls on the inner circle 74. The angular limits of each segment are defined by the images under the mapping L of a radial extension of the borders of its control segment 80.*i*. Its radial limits are defined by circle 74 on the inside, and circle 724 on the outside. Every annular segment 84.*i* is coloured differently from its neighbours, or distinguished by the display image property of the object 58.*i*. The annular segments 84.*i* are shown initially of equal size, and they never overlap in this example. FIG. 18 includes an initial configuration of such a representation in the display space 14.

In this example, there are sixteen data objects 58.*i* in the root node and therefore the same number of annular segments 84.*i*, distinguished by their colouring. Due to the power of recursion, $N_c$ need not be as large as in the previous two examples and values between 8 and 24 are typical.

Input and Feedback Output

The method in this example further includes tracking the position of a pointing object, a person's finger 40 in this case, with respect to the origin 60 in the touch sensitive control space 10. The distance $R_p$ from the origin 60 to the current position of the pointing object 40 and the angle $\theta_p$ from the reference line 600 to the line connecting the origin 60 to the pointing object 40 are determined and together constitute the polar coordinates ($R_p$, $\theta_p$) of the pointing object in control space. Whenever the position of the origin 60 is changed, as will be done in this example, the coordinates of the pointing object subsequently change as well. As before, the normalized radial coordinate $r_p = R_p/R$ is often used.

Using the linear map L, the interaction processor 28 establishes a pointer 44 in display space 14 corresponding to the pointing object 40 in control space 10. It calculates and continually updates the pointer position 44 in relation to the image of the origin 60. However, the position of the reference point 64 in display space that constitutes the centre of the circles 74 and 724, is continually updated to coincide with the moving pointer 44. The effect of this change in display reference 64, is that the display ring remains centred on the pointer 44, with the horizon 724 continually receding. While the display ring thus remains static with respect to the pointer, its contents, i.e. the annular segments, change according to the movement of the pointer.

A trajectory of the pointing object 40 may be established in the memory 18, represented as a sequence of pointing object positions together with the times at which the positions were determined. For this example, at least the last recorded position of the pointing object is needed.

Once the tracking of the pointing object 40 has started, the relative distances $R_{ip}$ and angles $\theta_{ip}$ of all control positions 50.*i* are calculated and continually updated, along with the change in angular coordinate $\Delta\theta_p$ between the current position and the position last recorded.

The display positions of the annular segments on the circle 74 are adjusted by changing the relative angles $\varphi_{ip}$ of the points 54.*i* with respect to the pointer 44 in the same way as in Example 2, using a two-piece convex-concave transformation function. The angular border between two annular segments is taken to pass radially halfway between the two display positions on the circle 74.

Changing Between Nodes in the Tree and Changing Control Positions

The method of the current example includes the introduction of a number of changes, constituting changing between the nodes in the data tree, if the trajectory of the pointing object 40 crosses the circle 70. The object at the current level which has the control position closest to the crossing point, say 50.$n$, is taken as the selected object n, and it becomes the new current node. However, the origin 60 is instantaneously moved to the crossing point, and the circle 70 is re-established with respect to it, with the same radius R as before.

An audible pop may be generated as an additional indicator that the current node has been changed.

The processor 28 then requests and receives new data from the data device 90, this time about the contents of the new current node object n, including the number $N_n$ and various particulars of the data objects it contains. An additional interactive object 58.($N_n$+1) is established as an exit object, which can be selected to return to the parent of the current node.

The new objects, including the exit object, are treated exactly like the original set of data, leading to new interactive objects 58.$i$, control positions 50.$i$ and control segments 80.$i$, but now with respect to the newly moved control origin 60, which may no longer be that close to the middle of the control space 10.

Should the origin 60 end up too close to the side of the screen for the user's taste, it may be manually shifted, together with all the associated control and display objects and their positions, by touching the screen with a second finger, dragging the two fingers together substantially in the same direction and over the same distance, and lifting the second finger again.

The changes in the display space 14 are somewhat less drastic, since the reference point 64 already (and continuously) coincides with the pointer 44, and the display ring 714 therefore need not be moved. Its contents, however, is instantaneously replaced with new annular segments 84.$i$ derived from the control space in the same way as before, with the display positions 54.$i$ on their inside borders.

The memory of the control trajectory needed for adaptation of motor advantage, is again the object control positions 50.$i$ with angular coordinates $\theta_i$. Feedback from the display space 14 is used to calculate the new values of 0, in control space 10, as in Example 2, and with much the same effect, although in the current example the changes occur in a moving reference frame.

From the description above these effects may seem frightfully complicated, but the high degree of continuity in the changes, together with the sustained visual feedback to the user, make the control of the system manageable and even enjoyable.

Someone skilled in the art will appreciate that the given procedure may be repeated recursively, allowing the continuously controlled traversal and focused visualization of an information tree containing data objects as terminals.

Action Output

The circle 70 bounding the control disk in this example, forms a natural threshold for passing to the next or previous levels of the tree structure. Having reached a level containing a terminal node, crossing this threshold in the control segment of the terminal node, say 80.$n$, triggers the sending of the command associated with the associated object 58.$n$ to data device 90. If the object 58.$n$ has music as content for example, the command may cause the playing of that music. If multiple control functions are desired on the same object, they may be implemented as another level in the tree hierarchy.

Illustration

Figure 19:
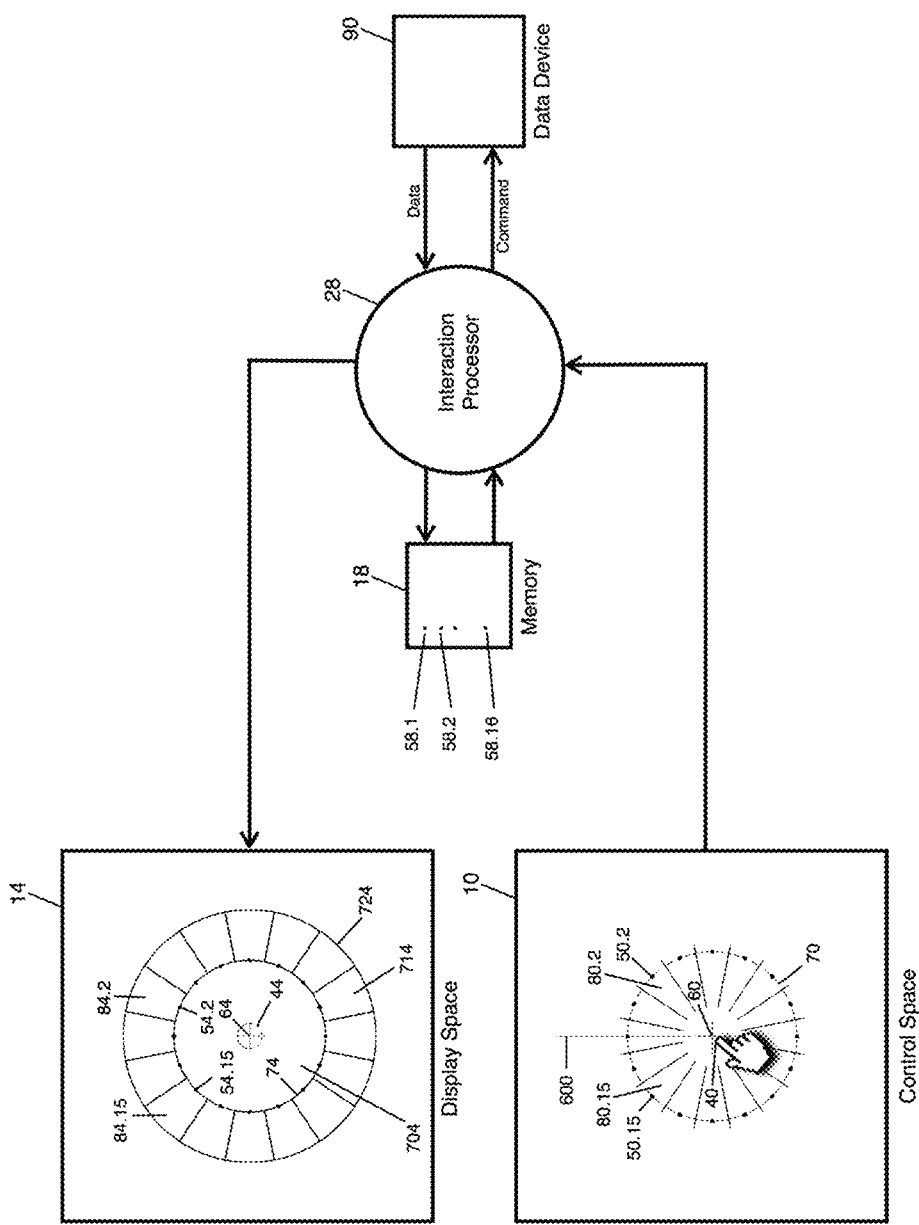
FIG. 19 is an example of a display space and a control space when a finger is positioned at an origin of the control space.

FIG. 19 shows the finger 40 at the origin 60 close to the middle of control space 10. The pointer 44 and reference point 64 coincide in display space 14, as they always do in this example. The normalized absolute distance $r_p$ is zero, which implies no change in display sizes or positions, or resulting changes in control segment positions from their initial values. The relative control distances $r_{ip}$ are all equal, leading to equal sizes for the annular segments.

Figure 20:
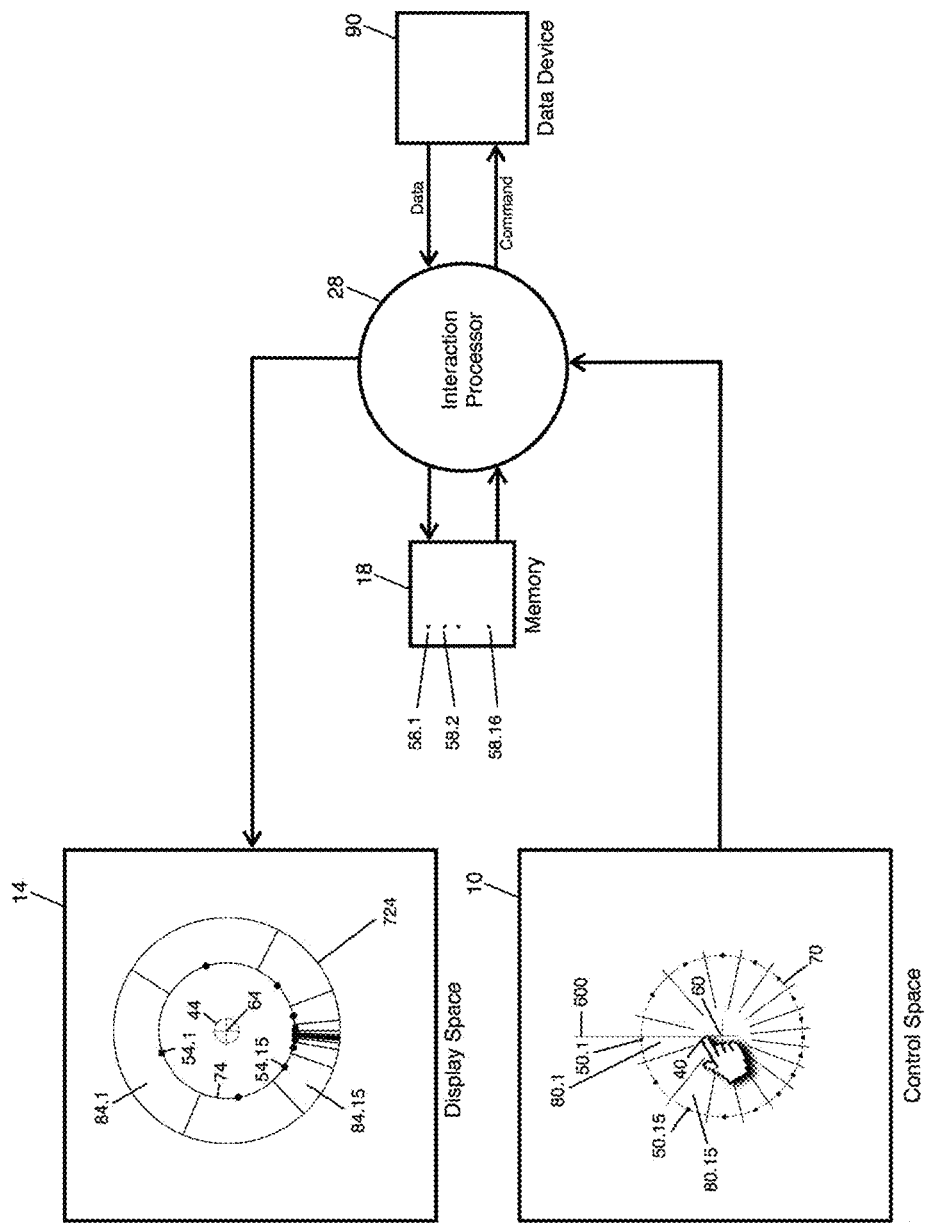
FIG. 20 is an example of a display space and a control space when a finger has moved towards a boundary within the control space.

FIG. 20 shows the finger 40 after radial movement about 20% of the distance to the circle 70 in the direction of control position 50.1, making 58.1 the focus object. Note that the display origin 64 and the display ring has moved along with the pointer 44, keeping the distance from the pointer 44 to the horizon 714 constant.

It is clear that 84.1 and its neighbours have grown, and that the other segments have shrunk. In addition, all segments except that of the focus object have undergone angular displacement on the circle 74, away from display point 54.1. On the opposite side of the circle 74, the segments have been compressed, but overlap is avoided.

Not only has the size of 84.1 grown in display space 14, giving the object a visual advantage with respect to a viewer-user, but the segment 80.1 has been increased in control space 10 as well, giving the object a motor advantage with respect to a selector-user. The increases in visual and motor advantage of object 58.1 and its neighbours are only possible due to the decrease in both advantages suffered by the object and its neighbours on the opposite side.

Figure 21:
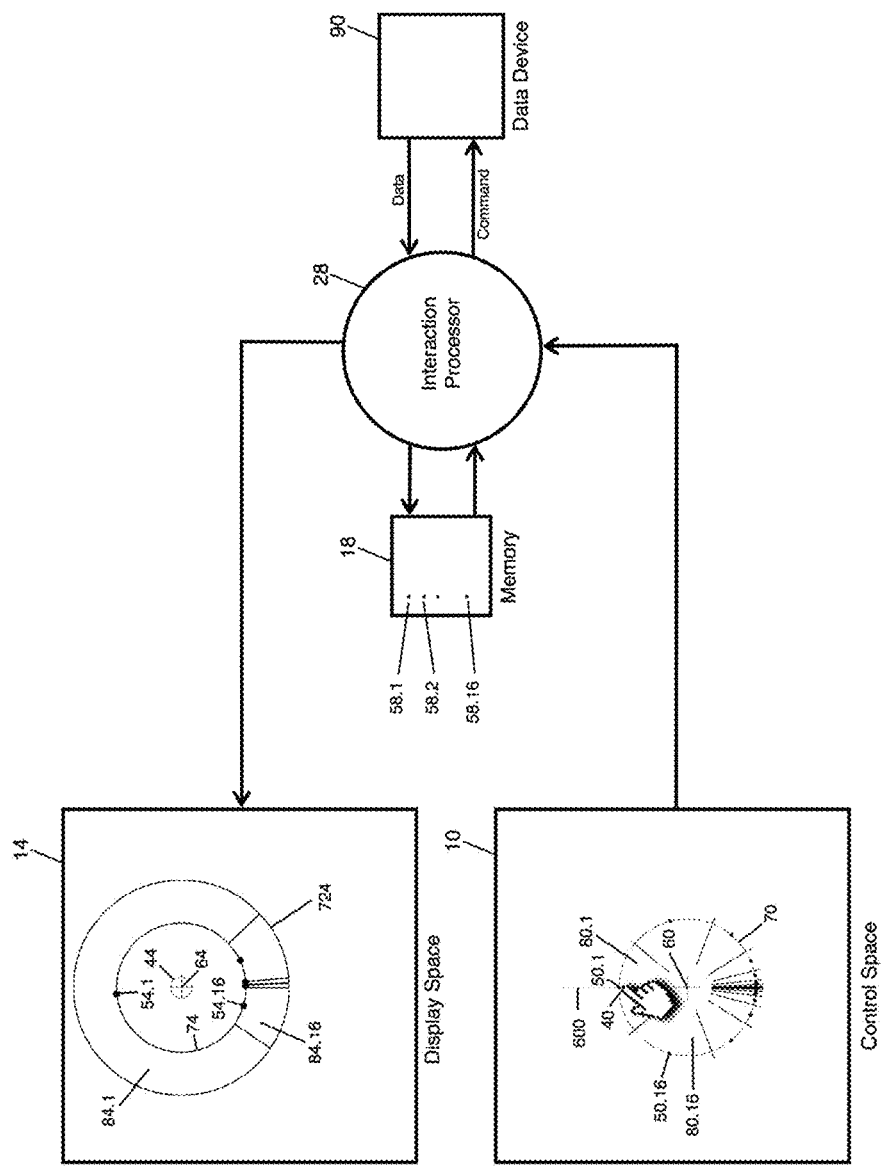
FIG. 21 is an example of the display space and the control space when the finger has further moved towards the boundary relative to FIG. E3-3.

FIG. 21 shows the finger after radial movement almost reaching the circle 70 in the same direction of 50.1. It is apparent that 84.1 has substantially surrounded the pointer 44, and that all other segments have been moved away and compressed. The difference in size between the control segments 80.$i$ is also more pronounced.

Figure 22:
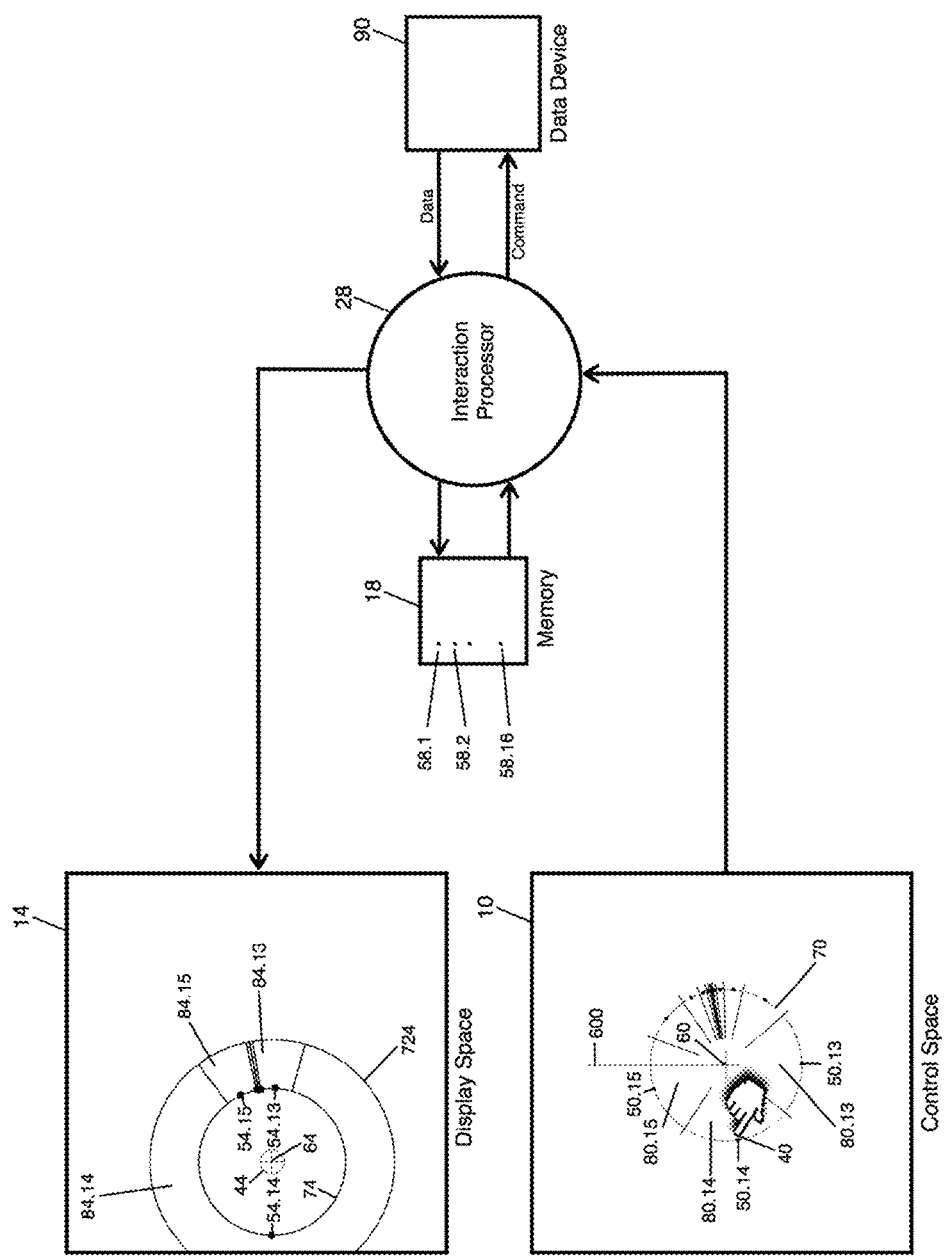
FIG. 22 is an example of the display space and the control space when the finger has moved 90 degrees counterclockwise subsequent to the position of FIG. E3-4.

FIG. 22 shows the result of about 90° anti-clockwise angular movement of the finger 40, subsequent to the position of FIG. 21. The movement has been extended to the point where annular segment 84.15 is the largest, indicating that object 58.15 has become the focus object, the focus having passed over 84.16. Note the angular position of 50.15 around the 9 o'clock position in FIG. 22, removed from its starting position in FIG. 18. This shift is indicative of the hysteresis in the system, which is essential for the adaptation of motor advantage.

The fact that object 58.15 must now be selected at a different angle than where it initially appeared, highlights the loss of fixed positions or angles for objects. This is an unavoidable side-effect of the desired hysteresis. It means that the user needs to rely on visual feedback, and that muscle memory may be of less value.

Figure 23:
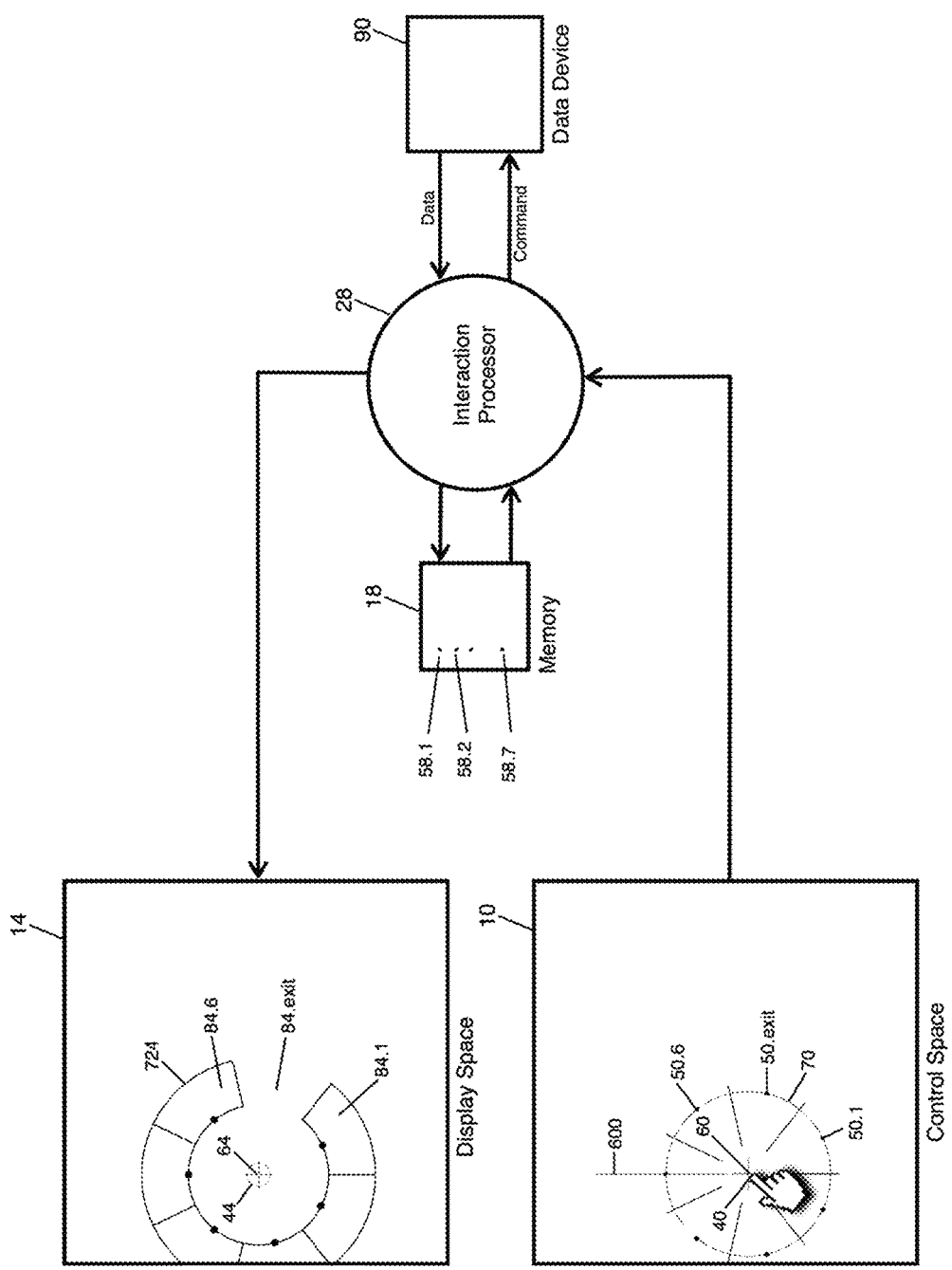
FIG. 23 is an example of the display space and the control space when the finger has crossed the boundary within the control space.

FIG. 23 shows the finger 40 after having crossed the circle 70 in the direction of 84.15. The origin 60 has been shifted to the crossing point, and the six objects of the next level have been introduced to the display ring 714. Note the added open segment 84. exit that provides a way to return to the previous level. Also note that some segments partially fall outside the display space 14, which may necessitate recentering.

The display of the disk at reference point 64 and the pointer 44 may be suppressed to eliminate visual clutter.

Conversely, the display of images under the map L of the boundaries of control segments 80.i may be enabled in display space in order to see exactly how the control weights are changing.

The tracking of the person's finger 40 and the resulting updates are performed in real time, so that the sizes and positions of annular segments 84.i appear to change continuously due to image retention on the human retina. The person thus has the experience of continuously and simultaneously controlling all the annular segments 84.i by moving his finger 40.

In addition, the user controls the trade-off between rate of navigation and ease of acquisition by radial finger movements. Its history, as remembered by the control positions 50.i, allows the user to advantageously focus on a subset from the large set of objects 58.i. Setting up the circle 70 as a radial threshold, further enables the user to smoothly navigate up and down the tree hierarchy.

Example 4. Controlling the Trade-Off Between Rate of Navigation and Ease of Acquisition in Three Dimensions The method is not limited to two-dimensional (2D) input or output. The following example demonstrates the use of a three-dimensional (3D) touch input device in conjunction with a 2D display device. Reference is made to FIGS. 24 to 27. A portion of control space 10 is allocated to every control function associated with each object of current interest, and a portion of display space 14 is allocated to every such object as well.

The scene is set by letting the processor 28 request and receive N selectable data objects from the data device 90.

Interactive data objects 58.i, with $1 \leq i \leq N$, are established as an instance of some class with properties in memory 18 for each received data object. Some of these properties are derived from the data device 90, while others are to be allocated by the processor 28. The objects 58.i may be rearranged or indexed to suit current needs.

The control weight $C_i$ of each object is initialized to a value of 1. The normalized control weight value $c_i$ may be used to determine the object's initial position and size in the control space 10.

A reference point or origin 60 is established at the bottom left corner of the control space 10.

A number of layout options may be used. In this example a grid based layout is described. Based on the number of data objects N and the aspect ratio (the ratio of a space's width against its height) of the control space, the grid is divided into $M_r$ rows and $M_c$ columns, so that the number of grid cells $N_G = M_r * M_c \geq N$. The grid is filled from bottom to top and from left to right. If the number of grid cells is more than the number of data objects, additional placeholder objects 58.j, where $N+1 \leq j \leq N_G$, are established as instances of some class with properties in memory 18. The remaining cells are filled with the placeholder objects 58.j. The control weight $C_j$ of each placeholder object is also initialized to a value of 1. The placeholder objects 58.j behave exactly as the data objects 58.i in control space 10, but are not represented visually in the display space 14. For the sake of clarity, only the index i will be used in the remainder of the example, where values of $i \leq N$ reference data objects and values of $N < i \leq N_G$ reference placeholder.

The interaction processor 28 may perform an algorithm, such as the following, to determine updated control positions 50.i and control segments 80.i for all objects in the control space 10 based on the control weights of objects and the dimensions of the control space 10:

1. Determine the available control space width $W_{cs}$ and height $H_{cs}$.
2. Determine the maximum width $W_{c,max}$ of each column:
   a. For each column, find the maximum control weight $C_{c,max}$ in that column.
   b. Normalise the maximum column weights with the sum of the weights in all columns:

$$C_{c,max,n} = \frac{C_{c,max}}{\sum_{a=1}^{M_c} C_{a,max}}.$$

c. Calculate width $W_{c,max}$ of each column: $W_{c,max} = C_{c,max,n} \cdot W_{cs}$.
3. Determine the maximum height $H_{r,max}$ of each row:
   a. For each row, find the maximum control weight $C_{r,max}$ in that row.
   b. Normalise the maximum row weights with the sum of the weights in all rows:

$$C_{r,max,n} = \frac{C_{r,max}}{\sum_{a=1}^{M_r} C_{a,max}}.$$

c. Calculate height $H_{r,max}$ of each row: $H_{r,max} = C_{r,max,n} \cdot H_{cs}$.
4. Calculate new sector sizes 80.i for each object:
   a. The width $w_{80.i}$ of an object 80.i is equal to the max width $W_{ci,max}$ the column $c_i$ it is in: $w_{80.i} = W_{ci,max}$.
   b. The height $h_{80.i}$ of an object 80.i is equal to the max height $H_{ri,max}$ of the row $r_i$ it is in: $h_{80.i} = H_{ri,max}$.
5. Calculate new control positions 50.i for each object:
   a. For each row in the grid-based container, calculate new x values $x_{50.i}$ for the control positions 50.i of the objects in the row. The new x values may be a function of the current object's control sector width $w_{80.i}$, the control sector widths of all the objects in the same row and the x value $x_{60}$ of the control reference point 60. One possible algorithm may be:
      i. Initialise a running total width value $W_U$ to zero.
      ii. For each object in the row, here denoted by index r, first calculate the new x position $$x_{50.r} = x_{60} + W_U + \frac{w_{80.r}}{2}$$

and then update the running total width value $W_U = W_U + w_{80.r}$.

b. For each column in the grid-based container, calculate new y values $y_{50.i}$ for the control positions 50.i of the objects in the column. The new y values may be a function of the current object's control sector height $h_{80.i}$, the control sector heights of all the objects in the same row and the y value $y_{60}$ of the control reference point 60. One possible algorithm may be:
      i. Initialise a running total height value $H_U$ to zero.
      ii. For each object in the column, here denoted by index $c_i$ first calculate the new y position $$y_{50.c} = y_{60} + H_U + \frac{h_{80.c}}{2}$$

and then update the running total height value $H_U = H_U + h_{80.c}$.

The size of the segments 80.*i* is therefore directly proportional to the control weights $C_i$. This layout algorithm ensures that control space allocations do not overlap.

In this example we assume that the aspect ratios of the control space 10 and display space 14 are the same. The processor 28 establishes a linear mapping L from the control space 10 to the display space 14, selected in such a way that the object positions 50.*i* and 54.*i* will occupy exactly the same position on the face of a touch screen device. The mapping L also establishes a reference point 64 in the display space 14 as the representation of the origin 60 in the control space 10.

The visual representation of each data object 58.*i* is accomplished by creating a pixel object 84.*i* centered on the corresponding display position 54.*i* in display space 14. The objects 84.*i* may take any convenient shape and size, but they are shown as rounded rectangles in this example. The pixel objects 84.*i* may be reduced in size to leave space between the objects.

In this example, there are forty-nine data objects 58.*i* and therefore the same number of rounded rectangle pixel objects 84.*i*, with labels ranging from 84.1 to 84.49.

As in previous examples the movement trajectory of a pointing object is tracked and stored in the memory 18, in this case a 3D touch capable control space 10. The position of the pointing object 40 in control space 10 is determined with respect to the origin 60. The interaction processor 28 optionally establishes the pointer 44 in display space 14, and calculates and continually updates its position in relation to the reference point 64, using the linear display map L.

The coordinates $x_{40}$, $y_{40}$ and $z_{40}$ of the current position of the pointing object 40 relative to the origin 2560, as well as the relative distances $r_{i,40}$ between all control points 50.*i* and the pointing object 40, are calculated and updated whenever the pointer object 40 moves. In this example, the touch plane is defined as z=0. The input device has a maximum z-axis value, denoted by $z_{40,max}$. To simplify some calculations a normalised z-axis value for the pointer object 40 is calculated as $$z_{40,n} = \frac{z_{40}}{z_{40,max}}.$$

Every time the position of the pointing object 40 change, new values of the control weights $C_i$ are calculated, using a control weight algorithm based on the coordinates of the pointer object 40 and the current control weights, as described below. This change in the $C_i$ triggers an update in the position and size of each object in control space 10 as described in the layout algorithm above.

New values of the control weights $C_i$ may be calculated using the following algorithm:

1. Define the global reduction value $v_p$ as a function of the pointer object 40's z-axis value. One possible function is $$v_p = (1 - z_{40,n}) e^{z_{40,n}}.$$

If the z-axis value is undefined, set $v_p = 0$.

2. Define the global counter value $M_p$ as a function of the global reduction value. One possible function is $M_p = (N_{min} - N_G) \cdot v_p + N_G$, where $N_{min}$ is the minimum number of objects to remain at full expansion. For a grid based layout algorithm, $N_{min}$ should ideally be chosen as the product of the minimum number of cells required in a row and the minimum number of cells required in a column at full expansion.

3. Store the $M_p$ values between updates and determine the change in the global counter value $\Delta M_p$. $\Delta M_p$ can be interpreted as the global change in control weight value.

4. As illustrated in previous examples, various strategies may be considered for updating the control weight values based on the pointer position 40 and the global counter value $M_p$. In this example we demonstrate a strategy where control weight is removed from objects that are the furthest away from the pointer, down to a minimum value of zero, when $\Delta M_p$ is negative; and control weight values are added to objects closest to the pointer, up to a maximum value of one, when $\Delta M_p$ is positive. More specifically:

a. Determine which data or placeholder object 58.*n* is closest to the pointer 40 in control space using the object control positions 50.*i*. Furthermore, determine the location (row $r_n$ and column $c_n$) of this object in the grid.

b. If $\Delta M_p$ is negative, start from the edges of the grid and search, using a contracting square pattern around the object 50.*n* closest to the pointer 40, for the furthest set of objects with a control weight value $C_i > 0$. Then uniformly distribute the reduction in global control weight value ($\Delta M_p$) across all objects in the set, to a minimum value of zero. If the control weight values of all objects in the furthest set of objects are reduced to zero, repeat step (b) to distribute the remaining global control weight value change to the next set of objects.

c. If $\Delta M_p$ is positive, start from the location of the object 50.*n* closest to the pointer 40 in the grid and search, using an expanding square pattern, for the closest set of objects located within the search pattern that contains objects with a control weight value $C_i < 1$. Then uniformly distribute the increase in global control weight value ($\Delta M_p$) across all objects in the set, to a maximum value of one. If the control weight values of all objects in the closest set of objects are increased to one, repeat step (c) to distribute the remaining global control weight value change to the next set of objects.

This continuous reallocation of control space 10 to the objects 58.*i* makes it easier to select the objects close to the nearest one 58.*n*, leading to a motor advantage under direct user control.

The changes in control space 10 are propagated to the display space 14 via the linear mapping L, resulting in a resizing and repositioning of the pixel objects 84.*i*.

Illustration

Figure 24:
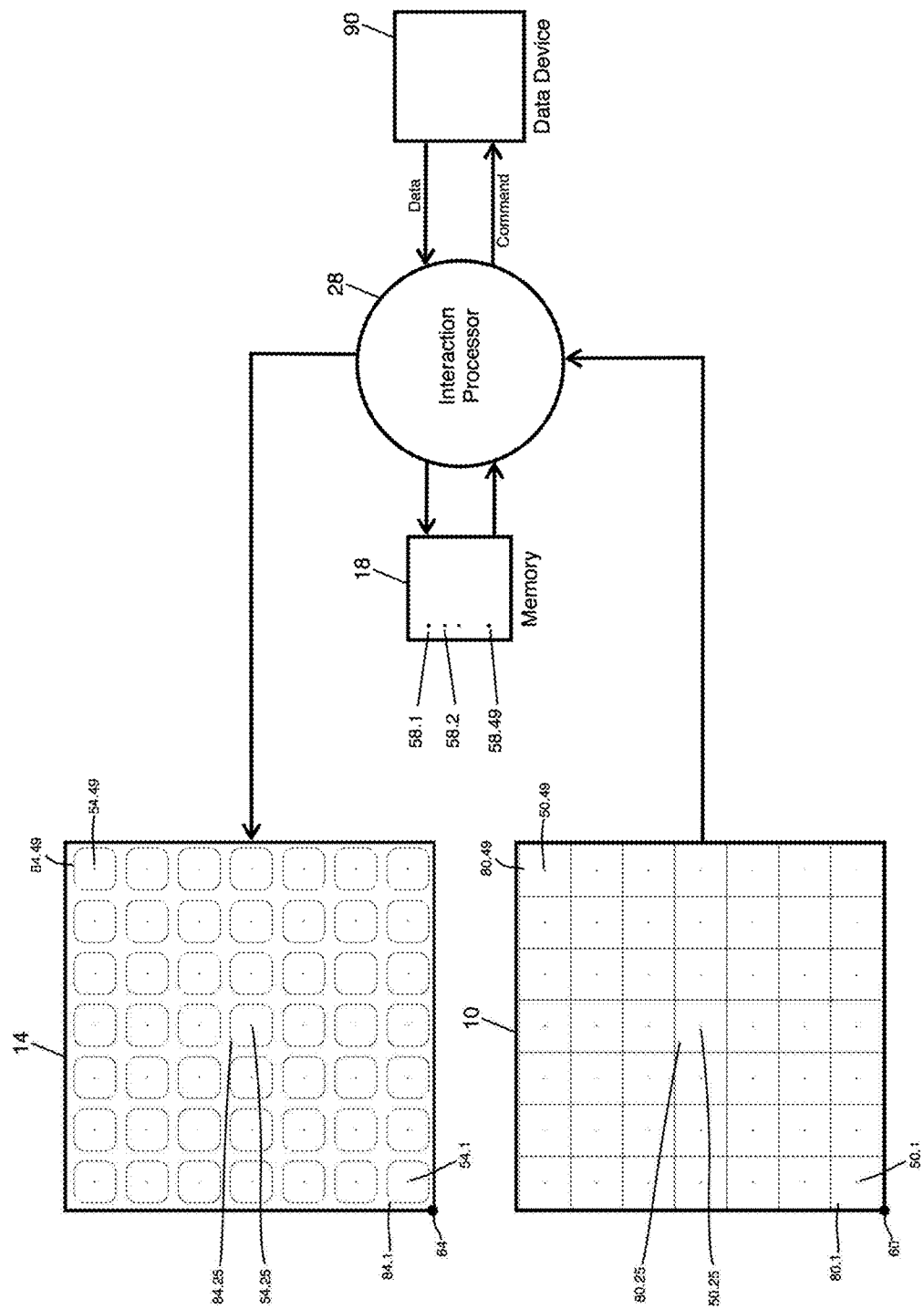
FIG. 24 shows an initial arrangement of objects in a control space and in a display space with no pointer present in the control space.

FIG. 24 shows the initial arrangement of objects in the control space 10 and display space after the processor 28 requests and receives forty-nine selectable data objects, each with a control weight value of one, from the data device 90 and the layout algorithm has been applied. No pointer object 40 is present in control space 10, with the result that $v_p = 0$ and $M_p = N_T$. The control weights Ci of the objects stays the same. All objects have the same control segment size and display size.

Figure 25:
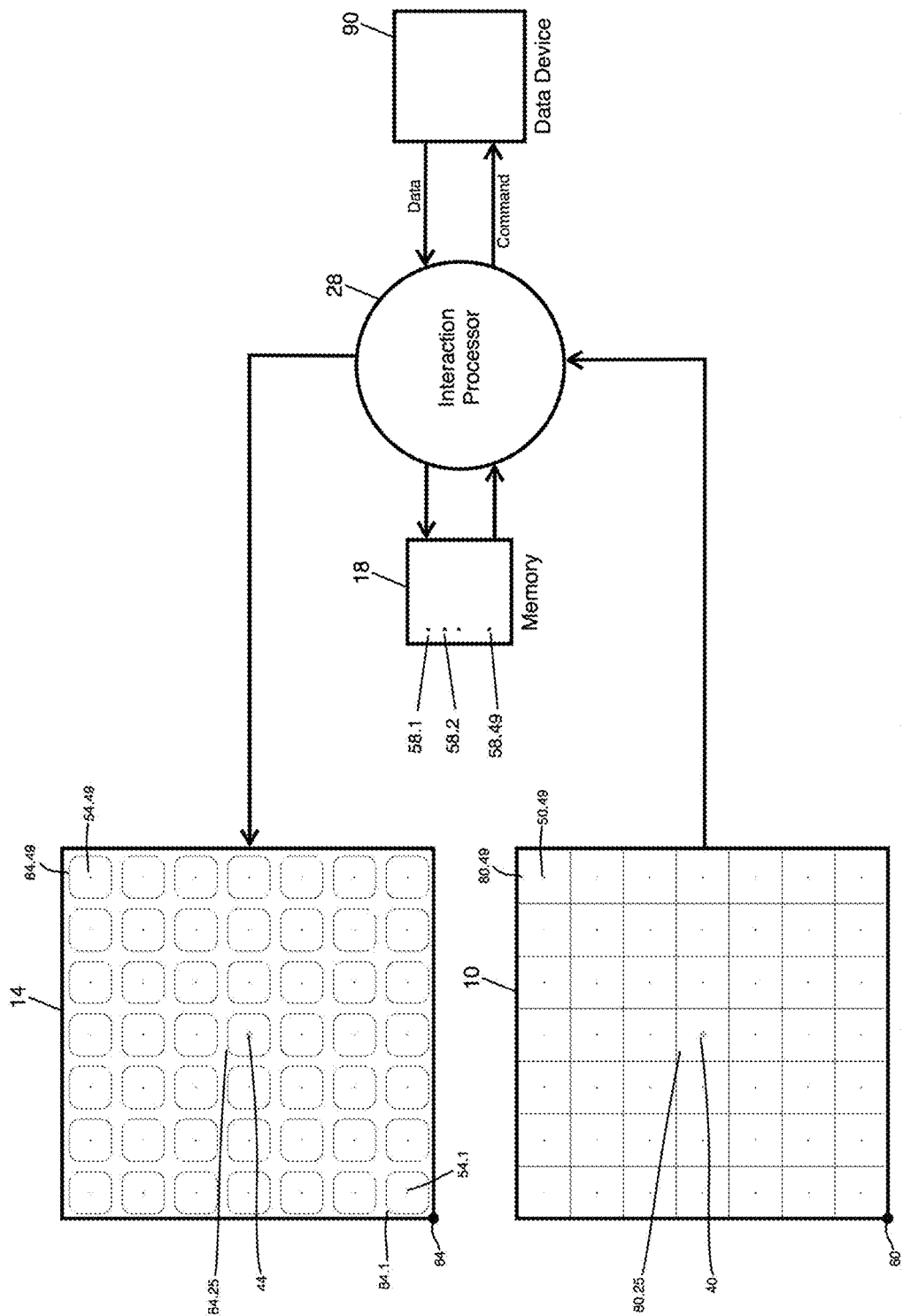
FIG. 25 shows the control space and the display space of FIG. E4-1 when a pointer is introduced above a control segment.

In FIG. 25 the pointer object 40 is introduced above control segment 80.25 with $z_{40} = z_{40,max}$. The result is again that $v_p = 0$ and $M_p = N_T$. Since the control weights $C_i$ did not change, the control positions 50.*i* and control segments 80.*i* in control space 10 stays the same. The arrangement and sizes of the pixel objects 84.$i$ in display space 14 is therefore also unchanged. Through the linear display transform L, the visual representation 44 of the pointer object 40 is introduced in display space 14.

Figure 26:
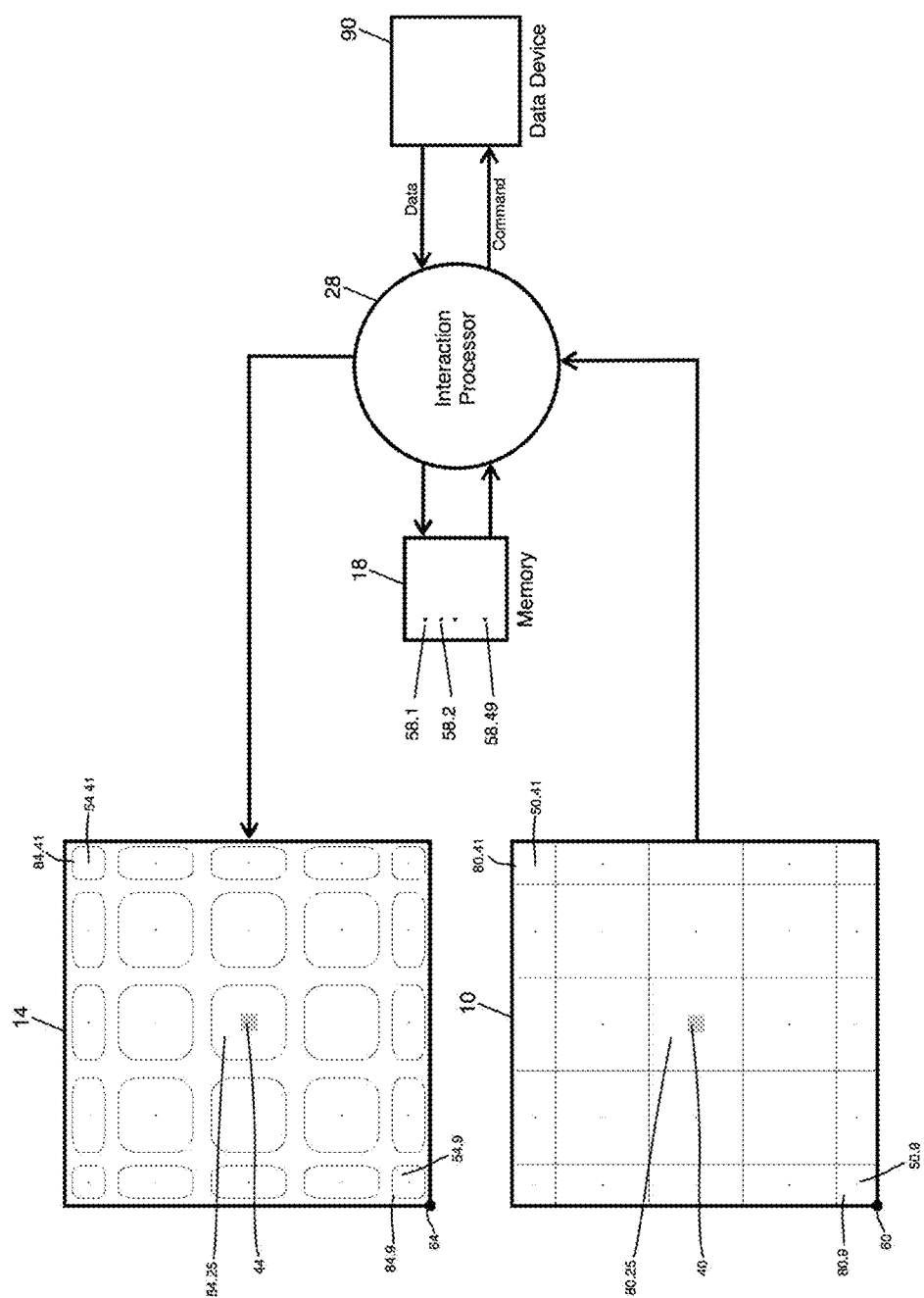
FIG. 26 shows the control space and the display space of FIG. E4-1 when the pointer is moved towards a touch plane in a z-axis.

In FIG. 26 the pointer object 40 moved towards the touch plane in the z-axis. The pointer object is still above control segment 80.25, but with $z_{40}$=0.5. The result is that $v_p$=0.824 and $M_p$=16.03. The control weights of the objects along the edge of the grid, which is furthest away from the object 80.25, have decreased to zero, while the control weights of the objects one row/column away from the edge of the grid have decreased to a value between zero and one. The control segments 80.$i$, control positions 50.$i$ and pixel objects 84.$i$ sizes and locations are adjusted to weight the available space, making selection easier.

Figure 27:
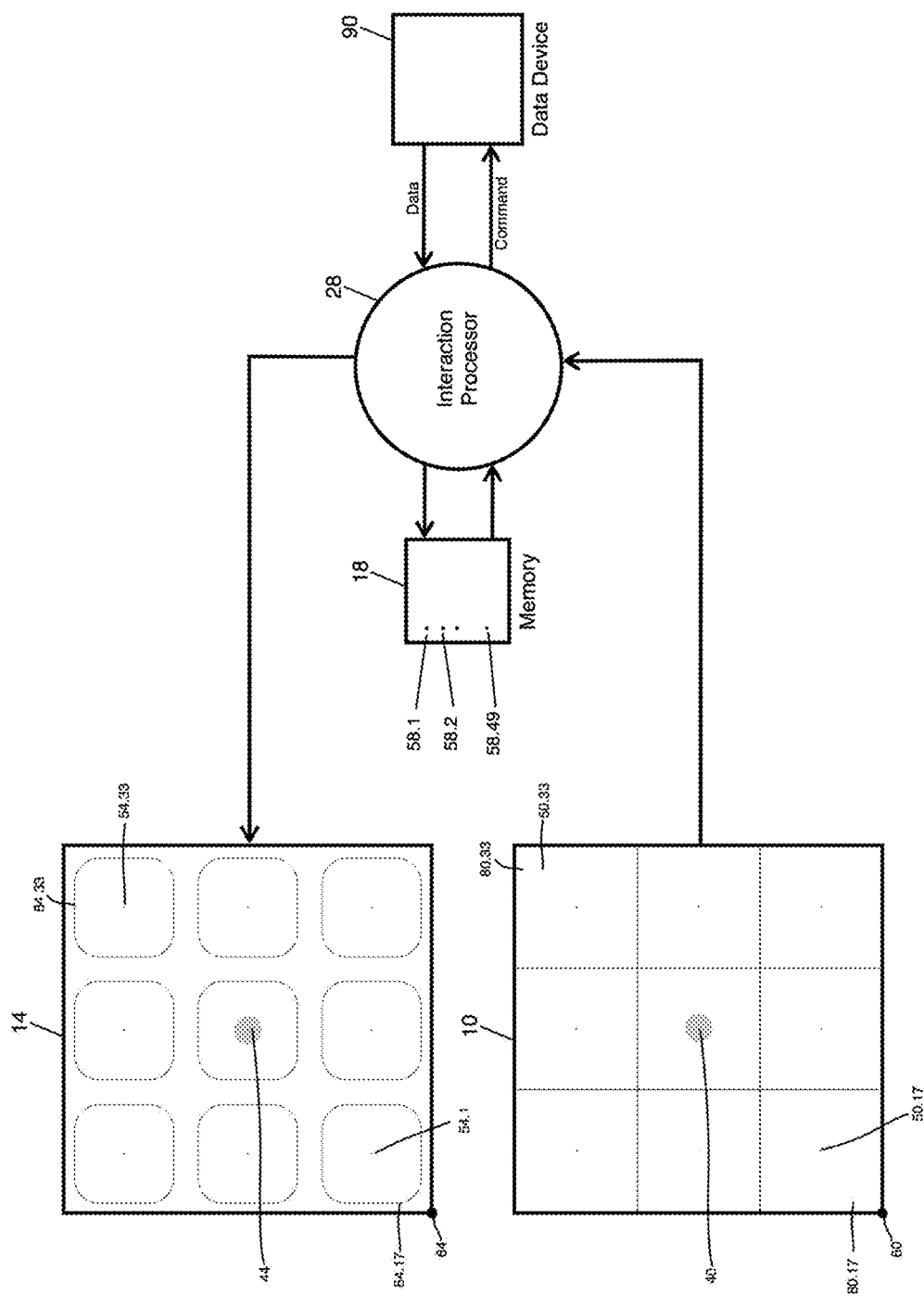
FIG. 27 shows the control space and the display space of FIG. E4-1 when the pointer moved onto the touch plane in a z-axis.

In FIG. 27 the pointer object 40 moved onto the touch plane in the z-axis. The pointer object is still above control segment 80.25, but now $z_{40}$=0. The result is that $v_p$=1 and $M_p$=$N_{min}$=9. The control weights of all but the 9 objects closest to control segment 80.25 have decreased to zero. The control segments 80.$i$, control positions 50.$i$ and pixel objects 84.$i$ sizes and locations of the objects closest to control segment 80.25 have been adjusted to fill all the available space.

This sequence has shown z-axis movement of the pointing object 40 from out of range onto the touch plane. Z-axis movement away from the touch plane has the reverse effect, namely restoring control weight to previously eliminated objects (reversing the transition from FIG. 27 to FIG. 24) and returning them to the control and display spaces. Transversal movement over the touch plane does not change control weight, but allows selection of any of the remaining objects. Movements that combine z-axis and xy-plane components have a correspondingly combined effect. Due to the visual feedback provided, this need not confuse the user. In practice, some hysteresis is applied to the interpretation of the trajectory to eliminate jitter due to inadvertent small movements.

The tracking of the person's finger 40 is repeated within short intervals of time. If the necessary calculations are completed in real time, the person has the experience of continuously and simultaneously controlling all the pixel objects 84.$i$ by moving his finger 40. In addition, the portion of control space 10 available for each of the objects 58.$i$ is also controlled by finger 40 movement and its history, allowing the user to effectively limit interaction to a small number from the large set of objects 58.$i$. This limitation is also easy to reverse.

It shall be understood that the examples are provided for illustrating the invention further and to assist a person skilled in the art with understanding the invention and are not meant to be construed as unduly limiting the reasonable scope of the invention.

What is claimed is:

1. A method for dynamic user control over the layout of a graphical user interface, which includes the steps of:

allocating an initial weight for each of a plurality of virtual objects;

setting a control weight for each of the plurality of virtual objects to the initial weight allocated for each of the plurality of virtual objects;

displaying the plurality of virtual objects in positions relative to each other without overlap along an edge of a convex space centered at a central point in at least two dimensions, each object of the plurality of objects occupying a segment of the convex space proportional to the control weight for the object;

receiving a position of pointer controlled by a user;

determining a radial line from the central point to the position of the pointer;

calculating a radial component of the position of the pointer in a direction of the radial line;

determining a total weight change based on a size of the calculated radial component;

selecting a direct object as an object of the plurality of virtual objects within a threshold angular distance of the radial line;

selecting an opposite object as an object of the plurality of virtual objects within the threshold angular distance of the radial line and in an opposite direction as the direct object;

in response to determining the radial component is directed away from the central point:
reducing the control weight for the opposite object by an amount based on the total weight change;
reducing the total weight change by the amount;
in response to the reduced control weight for the opposite object reaching zero and the reduced total weight change being non-zero, modifying control weights for one or more virtual objects adjacent to the opposite object by reducing the control weights for the one or more virtual objects adjacent to the opposite object based on the reduced total weight change;

in response to determining the radial component is directed away from the central point:
increasing the control weight for the opposite object by the amount based on the total weight change;
reducing the total weight change by the amount;
in response to the increased control weight for the opposite object reaching the initial weight allocated for the opposite object and the reduced total weight change being non-zero, modifying control weights for one or more virtual objects adjacent to the opposite object by increasing the control weights for the one or more virtual objects adjacent to the opposite object based on the reduced total weight change;

displaying the plurality of virtual objects without overlap along the edge of the convex space centered at the central point in at least two dimensions, where the opposite object occupies a segment of the convex space proportional to the increased control weight for the opposite object or to the decreased control weight for the opposite object, each of the other virtual objects occupy segments of the convex space proportional to a corresponding modified control weight, a direction of the direct object relative to the radial line is unchanged, and the positions of the virtual objects relative to each other is unchanged;

receiving a selection action from the user; and selecting a virtual object closest to the pointer when the selection action was received.

2. The method of claim 1, wherein the virtual objects represent one or more control functions.

3. The method of claim 1 wherein displaying the plurality of virtual objects without overlap along the edge of the convex space centered at the central point in at least two dimensions makes use of a display algorithm and/or heuristic, including drawing a graphical representation of the object on the display.

4. The method of claim 3, wherein the control algorithm and/or heuristic to effect the reallocation and pointing or navigation between objects in the control region is further configured so that:
the reallocation of the fraction of the control region is controlled directly or indirectly by one position coordinate of the user point; and
the pointing or navigation is controlled directly or indirectly by another, orthogonal, position coordinate of the user point.

5. The method of claim 4, wherein the method uses coordinates that are orthogonal to each other.

6. The method of claim 5, wherein the control algorithm uses polar coordinates with the radial position coordinate of the user point controlling the reallocation of the control region and the transversal (angular) coordinate controlling the navigation in the control region.

7. The method of claim 1, wherein calculating a radial component of the position of the pointer in a direction of the radial line is based on an absolute position of the pointer.

8. The method of claim 1, which method includes a step of using an action algorithm and/or heuristic to determine an action to be performed, if any.

9. The method of claim 8, wherein, if an action to be performed has been determined by the action algorithm and/or heuristic, the method includes a step of performing the action.

10. The method of claim 1, including mapping the object control positions to display positions in the display region and displaying a representation of the objects in relation to their display positions, the method further includes displaying one or more objects at positions removed from their display region positions and therefore removed from their control region positions.

11. The method of claim 1, which method includes a step of selecting an object or allowing an object to be selected.

12. The method of claim 1, which method includes the step of establishing a threshold in the control region and another step of selecting and object when the threshold is crossed.

13. The method of claim 1, which method includes the step of tracking the history of the pointer with respect to the central point in the control region to enable reversing input action by a user.

14. The method of claim 13, which method includes sensing the pointer within a threshold distance of the central point to reset the virtual objects to their original positions along the edge of the convex space.

15. The method of claim 14, wherein, in the case of a touch sensitive screen, the central point position is made dependent on a user's first point of touch.

16. The method of claim 1, which method uses an algorithm or a heuristic to determine a new control weight for each virtual object, and includes a function whereby the control weight of the virtual object can be increased or reduced as a function of time or navigation distance, towards a standard value of control weight.

17. The method of claim 1, further comprising interpreting a touch on a touch-sensitive screen as a typical GUI object selection, after the finger has been lifted from the touch-sensitive screen.

18. The method of claim 1, wherein a unique segment for a virtual object radiates and extends past the boundary of the convex space turning towards points on the boundary from the inside of the convex space into symmetrically reflected approaches from the outside of the convex space.

19. The method of claim 1, wherein an algorithm or a heuristic to determine a new object control position for each object translates those positions, including those approaching the pointer position, in such a way that the positions will remain on the boundary of the convex space.

20. The method of claim 1, wherein in response to the reduced control weight for the opposite object reaching zero and the reduced total weight change being non-zero, reducing control weights for one or more virtual objects adjacent to the opposite object based on the reduced total weight change comprises:
decreasing the reduced total weight change by one or more amounts by which the control weights for the one or more virtual objects adjacent to the opposite object were reduced;
in response to a reduced control weight for a virtual object adjacent to the opposite object being greater than zero and the reduced total weight change after being decreased being greater than zero, further decreasing the reduced control weight for the virtual object adjacent to the opposite object by an amount based on the reduced total weight change after being decreased.

21. The method of claim 1, wherein in response to the increased control weight for the opposite object reaching the initial weight allocated for the opposite object and the reduced total weight change being non-zero, increasing control weights for one or more virtual objects adjacent to the opposite object based on the reduced total weight change comprises:
decreasing the reduced total weight change by one or more amounts by which the control weights for the one or more virtual objects adjacent to the opposite object were increased;
in response to an increased control weight for a virtual object adjacent to the opposite object being less than an initial weight for the virtual object adjacent to the opposite object and the reduced total weight change after being decreased being greater than zero, further increasing the increased control weight for the virtual object adjacent to the opposite object by an amount based on the reduced total weight change after being decreased.

* * * * *